United States Patent
Park et al.

(10) Patent No.: US 10,701,728 B2
(45) Date of Patent: Jun. 30, 2020

(54) OPERATION METHOD IN WIRELESS LAN SYSTEM, AND APPARATUS FOR SAME

(71) Applicant: LG ELECTRONICS INC., Seoul (KR)

(72) Inventors: Sungjin Park, Seoul (KR); Hangyu Cho, Seoul (KR); Jinmin Kim, Seoul (KR); Kyungtae Jo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 20 days.

(21) Appl. No.: 16/067,553

(22) PCT Filed: Dec. 28, 2016

(86) PCT No.: PCT/KR2016/015391
§ 371 (c)(1),
(2) Date: Jun. 29, 2018

(87) PCT Pub. No.: WO2017/116137
PCT Pub. Date: Jul. 6, 2017

(65) Prior Publication Data
US 2019/0007964 A1 Jan. 3, 2019

Related U.S. Application Data

(60) Provisional application No. 62/272,090, filed on Dec. 29, 2015, provisional application No. 62/277,480, (Continued)

(51) Int. Cl.
*H04W 4/00* (2018.01)
*H04W 72/14* (2009.01)
(Continued)

(52) U.S. Cl.
CPC .......... *H04W 72/14* (2013.01); *H04W 72/04* (2013.01); *H04W 72/0493* (2013.01);
(Continued)

(58) Field of Classification Search
CPC . H04W 72/14; H04W 72/0493; H04W 84/12; H04W 72/04; H04W 72/12; H04W 74/08
(Continued)

(56) References Cited

U.S. PATENT DOCUMENTS

2014/0086200 A1 3/2014 Seok
2016/0337906 A1* 11/2016 Cordeiro .......... H04W 72/0453
(Continued)

FOREIGN PATENT DOCUMENTS

KR 1020150040356 4/2015
WO 2014171895 10/2014
(Continued)

OTHER PUBLICATIONS

PCT International Application No. PCT/KR2016/015391, Written Opinion of the International Searching Authority dated Apr. 11, 2017, 25 pages.
(Continued)

*Primary Examiner* — Chuong T Ho
(74) *Attorney, Agent, or Firm* — Lee Hong Degerman Kang Waimey

(57) ABSTRACT

The present specification relates to an operational configuration of a station and an access point in a wireless LAN (WLAN) system. More specifically, the present specification suggests a method for a station or an access point to operate in a case where at least one channel is dynamically allocated during a data transmission interval (DTI) in a wireless LAN system, and an apparatus for the same.

17 Claims, 22 Drawing Sheets

Related U.S. Application Data filed on Jan. 12, 2016, provisional application No. 62/278,435, filed on Jan. 14, 2016, provisional application No. 62/306,085, filed on Mar. 10, 2016, provisional application No. 62/364,330, filed on Jul. 20, 2016, provisional application No. 62/384,772, filed on Sep. 8, 2016.

(51) Int. Cl.
*H04W 84/12* (2009.01)
*H04W 72/04* (2009.01)
*H04W 72/12* (2009.01)
*H04W 74/08* (2009.01)

(52) U.S. Cl.
CPC ........... *H04W 72/12* (2013.01); *H04W 74/08* (2013.01); *H04W 84/12* (2013.01)

(58) Field of Classification Search
USPC ........................................ 370/328, 329, 330
See application file for complete search history.

(56) References Cited

U.S. PATENT DOCUMENTS

| | | | | |
|---|---|---|---|---|
| 2017/0034823 A1* | 2/2017 | Cariou | ................. | H04W 72/12 |
| 2017/0064583 A1* | 3/2017 | Roy | ................. | H04W 36/0005 |
| 2018/0132253 A1* | 5/2018 | Li | ................. | H04W 28/04 |
| 2018/0206139 A1* | 7/2018 | Wang | ................. | H04B 7/15507 |
| 2020/0045574 A1* | 2/2020 | Wang | ................. | H04B 7/2606 |

FOREIGN PATENT DOCUMENTS

| | | |
|---|---|---|
| WO | 2015032273 | 3/2015 |
| WO | 2015038175 | 3/2015 |
| WO | 2015084095 | 6/2015 |

OTHER PUBLICATIONS

European Patent Office Application U.S. Appl. No. 16882089.2, Search Report dated Jun. 4, 2019, 9 pages.

Nitsche, T. et al., "IEEE 802.11ad: Directional 60 GHz Communication for Multi-Gigabit-per-Second Wi-Fi", IEEE Communications Magazine, XP011567636, Dec. 2014, 10 pages.

Zhou, P. et al., "IEEE 802.11ay based mmWave WLANs: Design Challenges and Solutions", IEEE Communications Surveys & Tutorials, XP080861500, Mar. 2018, 27 pages.

Ghasempour, Y. et al., "IEEE 802.11ay: Next-generation 60 GHz Communication for 100 Gbps Wi-Fi", Retrieved from the Internet, XP055420042, Sep. 2017, 7 pages.

* cited by examiner

| CH 1 | L - STF | L - CE | L - Header | ay Header A | ay STF | ay CE | ay Header B | ay payload |
|---|---|---|---|---|---|---|---|---|
|  | GF-STF | GF-CE |  |  |  |  |  |  |
| CH 2 | L - STF | L - CE | L - Header | ay Header A |  |  |  |  |

(L: legacy, GF: gap filling, ay: 802.11ay)

| | Channel 1 | Channel 2 | Channel 3 | Channel 4 | Channel 5 | Channel 6 |
|---|---|---|---|---|---|---|
| 1 | p | | | | | |
| 2 | | p | | | | |
| 3 | | | p | | | |
| 4 | | | | p | | |
| 5 | | | | | p | |
| 6 | | | | | | p |
| 7 | p | | | | | |
| 8 | | | p | | | |
| 9 | p | | | | | |
| 10 | | | | p | | |
| 11 | p | | | | | |
| 12 | | | | | p | |
| 13 | p | | | | | |
| 14 | | | | | | p |
| 15 | | p | | | | |
| 16 | | | | p | | |
| 17 | | p | | | | |
| 18 | | | | | p | |
| 19 | | p | | | | |
| 20 | | | | | | p |
| 21 | | | p | | | |
| 22 | | | | | p | |
| 23 | | | p | | | |
| 24 | | | | | | p |
| 25 | | | | p | | |
| 26 | | | | | | p |
| 27 | p | | | | | |
| 28 | | p | | | | |
| 29 | | p | | | | |
| 30 | | | p | | | |
| 31 | | | p | | | |
| 32 | | | | p | | |
| 33 | | | | p | | |
| 34 | | | | | p | |
| 35 | | | | | p | |
| 36 | | | | | | p |
| 37 | p | | | | | |
| 38 | | p | | | | |
| 39 | | | p | | | |
| 40 | | | | p | | |
| 41 | | | | | p | |
| 42 | | | | | | p |
| 43 | p | | | | | |
| 44 | | p | | | | |
| 45 | | | p | | | |
| 46 | | | | p | | |

EDMG Extended Schedule element

| Octets: 1 | 1 | TBD | TBD | ... | TBD |
|---|---|---|---|---|---|
| Element ID | Length | Allocation #1 | Allocation #2 | ... | Allocation #n |

| Octets: 3 | TBD | 1 | 1 | 4 | 2 | 1 | 2 |
|---|---|---|---|---|---|---|---|
| Allocation Control | Beamforming (BF) Control | Source AID | Destination AID | Allocation Start | Allocation Block Duration | Number of Blocks | Allocation Block Period |

| b0~b3 | b4~b6 | b7 | b8 | b9 | b10 | b11 | b12 | b13~b20 | b21~b23 |
|---|---|---|---|---|---|---|---|---|---|
| Allocation ID | Allocation Type | Pseudo-static | Truncatable | Extendable | PCP Active | LP SC Used | Channel Aggregation Mode | Bandwidth | Primary channel |

OPERATION METHOD IN WIRELESS LAN SYSTEM, AND APPARATUS FOR SAME

CROSS-REFERENCE TO RELATED APPLICATIONS

This application is the National Stage filing under 35 U.S.C. 371 of International Application No. PCT/KR2016/015391, filed on Dec. 28, 2016, which claims the benefit of U.S. Provisional Application Nos. 62/272,090, filed on Dec. 29, 2015, 62/277,480, filed on Jan. 12, 2016, 62/278,435, filed on Jan. 14, 2016, 62/306,085, filed on Mar. 10, 2016, 62/364,330, filed on Jul. 20, 2016, and 62/384,772, filed on Sep. 8, 2016, the contents of which are all hereby incorporated by reference herein in their entirety.

TECHNICAL FIELD

The present invention relates to operational configurations of a station and an access point in a wireless local area network (WLAN) system, and more particularly, to an operation method for a station or an access point when at least one channel is dynamically allocated during a data transmission interval (DTI) in a WLAN system and apparatus therefor.

BACKGROUND ART

Standards for the WLAN technology have been developed as Institute of Electrical and Electronics Engineers (IEEE) 802.11 standards. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps.

The above-described WLAN standards have evolved into IEEE 802.11ac that uses a bandwidth of up to 160 MHz and supports a transmission rate of up to 1 Gbits/s for 8 spatial streams and IEEE 802.11ax standards are under discussion.

Meanwhile, IEEE 802.11ad defines performance enhancement for high-speed throughput in the 60 GHz band, and IEEE 802.11ay, for introducing channel bonding and MIMO technology to IEEE 802.11ad systems for the first time, is being discussed.

DISCLOSURE OF THE INVENTION

Technical Task

A method for dynamically allocating a predetermined length of allocation periods within a data transmission interval (DTI) to at least one station (STA) during the DTI in the IEEE 802.11ay system supporting a plurality of channels has been required. Particularly, a method for dynamically allocating at least one channel except the primary channel configured in the system among the plurality of channels needs to be developed.

Together with the method, a channel that can be used by a specific STA as the primary channel during a dynamic allocation period where the at least one channel except the primary channel is allocated should be designated.

Technical Solutions

To achieve these objects and other advantages and in accordance with the purpose of the invention, in an aspect of the present invention, provided herein is an operating method for an access point (AP) in wireless local area network (WLAN) system, including transmitting a first grant frame for dynamically allocating a first allocation period within a data transmission interval (DTI) to a first station (STA) during the DTI, wherein the first grant frame may include dynamic allocation information for allocating a plurality of channels including a first primary channel or at least one channel except the first primary channel in the first allocation period.

In this case, when the at least one channel except the first primary channel is allocated in the first allocation period, the dynamic allocation information may further include information indicating a second primary channel that operates as a primary channel during the first allocation period.

Additionally, the first grant frame may be transmitted during the DTI.

Additionally, the first grant frame may further include information on a channel bandwidth allocated to the first STA.

Additionally, the first allocation period may be configured with either a contention-based access period (CBAP) or a service period (SP).

Additionally, the first grant frame may further include information on an operating mode of the first STA during the first allocation period.

In this case, the operating mode information may indicate either a first operating mode for performing channel sensing (CS) on all of the allocated channels or a second operating mode for performing the CS on only a channel that operates as a primary channel among the allocated channels.

Additionally, a second grant frame for dynamically allocating a second allocation period within the DTI may be transmitted to a second STA during the DTI, and the first and second allocation periods may partially overlap with each other in time and frequency domains.

Additionally, a polling frame may be transmitted to the first STA before the transmission of the first grant frame.

In another aspect of the present invention, provided herein is an operating method for a first station (STA) in a wireless local area network (WLAN) system, including receiving a first grant frame for dynamically allocating a first allocation period within a data transmission interval (DTI) from an access point (AP) during the DTI, wherein the grant frame may include dynamic allocation information for allocating a plurality of channels including a first primary channel or at least one channel except the first primary channel in the first allocation period.

In this case, when the at least one channel except the first primary channel is allocated in the first allocation period, the dynamic allocation information may further include information indicating a second primary channel that operates as a primary channel during the first allocation period.

In particular, when the at least one channel except the first primary channel is allocated in the first allocation period, the STA may perform at least one of a backoff procedure through the second primary channel during the first allocation period and network allocation vector (NAV) configuration.

Additionally, the first STA may transmit and receive data to and from a second STA through the channels allocated during the first allocation period.

Additionally, when a plurality of channels are allocated during the first allocation period, the first STA may transmit and receive data to and from a second STA by bonding or aggregating the plurality of channels.

Additionally, when a plurality of channels are allocated during the first allocation period, the first STA may transmit a ready-to-send (RTS) frame to a second STA through each of the plurality of channels.

Additionally, a clear-to-send (CTS) frame may be received through at least one channel among the plurality of channels, and data may be transmitted and received to and from a second STA through only the at least one channel through which the CTS frame is received among the plurality of channels.

Additionally, when a plurality of channels are allocated during the first allocation period, the first STA may receive a ready-to-send (RTS) frame from a second STA through each of the plurality of channels and transmit a clear-to-send (CTS) frame through at least one idle channel among the plurality of channels.

Additionally, a service period request (SPR) frame including an operating mode of the first STA may be transmitted to the AP before the reception of the grant frame.

In still another aspect of the present invention, provided herein is an access point (AP) device for operating in a wireless local area network (WLAN) system, including: a transceiver with at least one radio frequency (RF) chain, wherein the transceiver may be configured to transmit and receive frame signals to and from a station (STA); and a processor connected to a receiver, wherein the processor may be configured to process the frame signals transmitted and received by the transceiver and control the transceiver to transmit a grant frame for dynamically allocating a first allocation period within a data transmission interval (DTI) to a first STA during the DTI, wherein the grant frame may include dynamic allocation information for allocating a plurality of channels including a first primary channel or at least one channel except the first primary channel in the first allocation period.

In a further aspect of the present invention, provided herein is a station (STA) device for operating in a wireless local area network (WLAN) system, including: a transceiver with at least one radio frequency (RF) chain, wherein the transceiver may be configured to transmit and receive frame signals to and from an access point (AP); and a processor connected to the transceiver, wherein the processor may be configured to process scheduling information transmitted and received by the transceiver and control the transceiver to receive a grant frame for dynamically allocating a first allocation period within a data transmission interval (DTI) from an access point (AP) during the DTI, and wherein the grant frame may include dynamic allocation information for allocating a plurality of channels including a first primary channel or at least one channel except the first primary channel in the first allocation period.

Advantageous Effects

According to the present invention, it is possible to provide a method for dynamically allocating a predetermined length of allocation periods within a data transmission interval (DTI) to at least one station (STA) during the DTI in the IEEE 802.11ay system supporting a plurality of channels. In particular, a method for dynamically allocating at least one channel except the primary channel configured in the system among the plurality of channels can be provided.

In addition, a channel that can be used by a specific STA as the primary channel during an allocation period where the at least one channel except the primary channel is allocated can be designated.

The effects that may be obtained by the present invention are not limited to the above-mentioned effects, and other effects not mentioned above will be clearly understood by those skilled in the art from the following description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 24 to 26 are diagrams illustrating a method performed by a PCP/AP to provide information on an allocated channel and an alternative primary channel to a specific STA according to proposed embodiments of the present invention;

FIG. 27 is a diagram illustrating an extended schedule element included in a beacon or announcement (announce) frame applicable to the present invention;

BEST MODE FOR INVENTION

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the present invention.

As described above, a detailed description will be given of the introduction of the concept of a downlink oriented channel, and a method and apparatus for conducting communication using a downlink oriented channel in a high-density Wireless Local Area Network (WLAN) system.

1. Wireless LAN (WLAN) System 1-1. Generals of WLAN System

Figure 1:
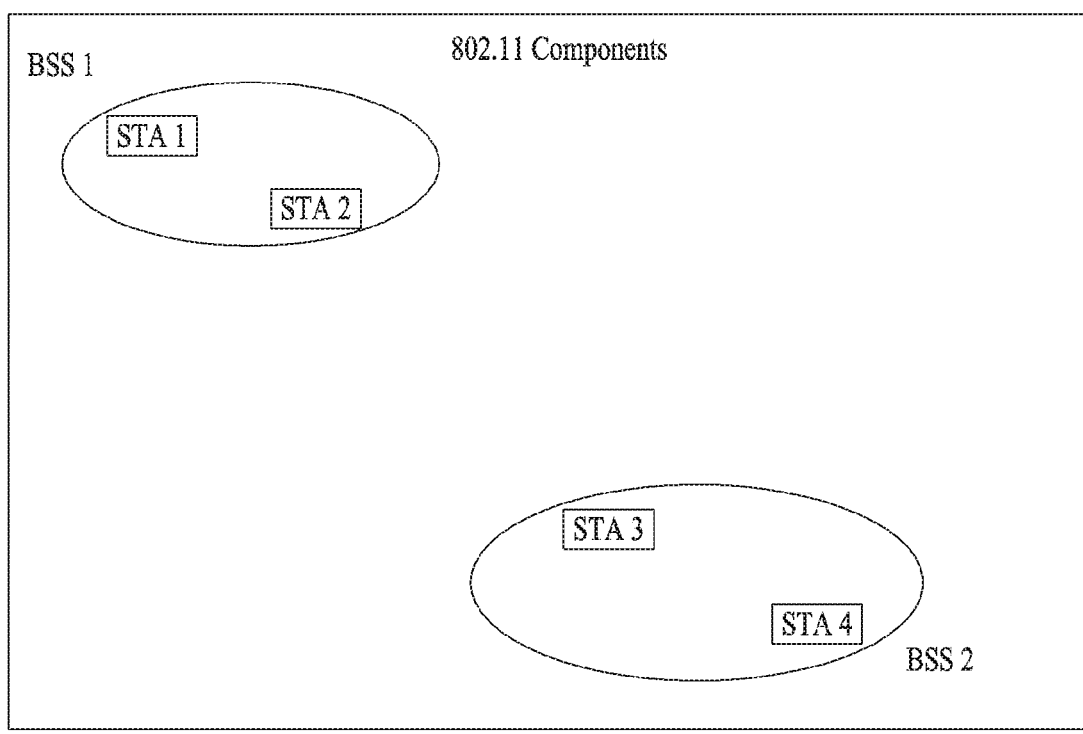
FIG. 1 is a diagram illustrating an exemplary configuration of a Wireless Local Area Network (WLAN) system.

FIG. 1 is a diagram illustrating an exemplary configuration of a WLAN system.

As illustrated in FIG. 1, the WLAN system includes at least one Basic Service Set (BSS). The BSS is a set of STAs that are able to communicate with each other by successfully performing synchronization.

An STA is a logical entity including a physical layer interface between a Medium Access Control (MAC) layer and a wireless medium. The STA may include an AP and a non-AP STA. Among STAs, a portable terminal manipulated by a user is the non-AP STA. If a terminal is simply called an STA, the STA refers to the non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

The AP is an entity that provides access to a Distribution System (DS) to an associated STA through a wireless medium. The AP may also be referred to as a centralized controller, a Base Station (BS), a Node-B, a Base Transceiver System (BTS), or a site controller.

The BSS may be divided into an infrastructure BSS and an Independent BSS (IBSS).

The BSS illustrated in FIG. 1 is the IBSS. The IBSS refers to a BSS that does not include an AP. Since the IBSS does not include the AP, the IBSS is not allowed to access to the DS and thus forms a self-contained network.

Figure 2:
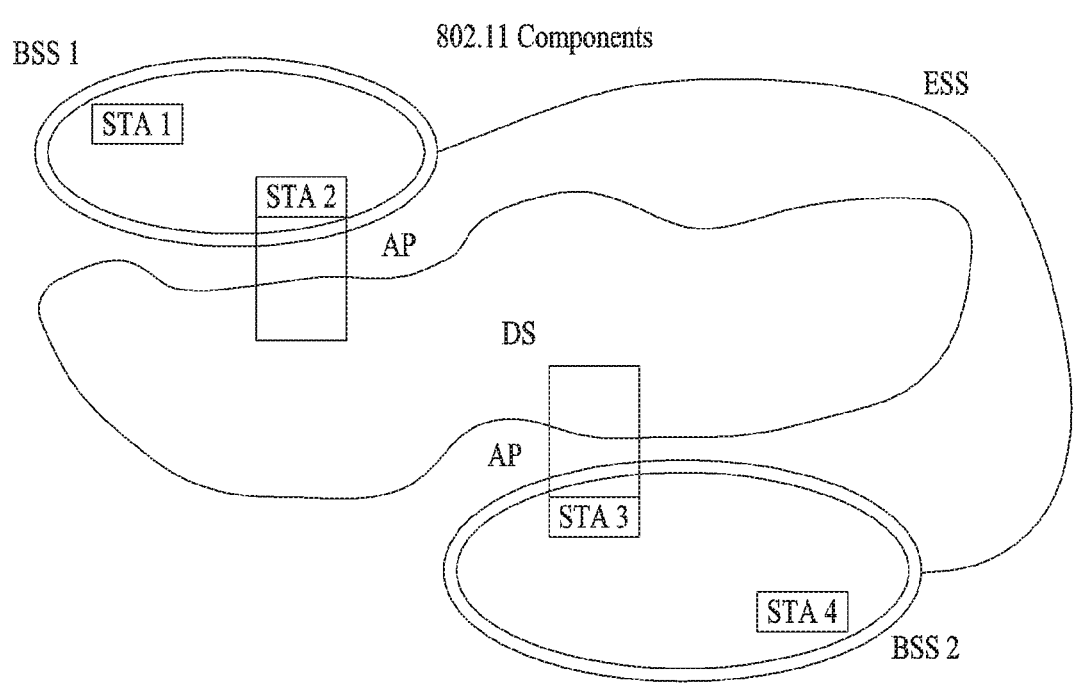
FIG. 2 is a diagram illustrating another exemplary configuration of a WLAN system.

FIG. 2 is a diagram illustrating another exemplary configuration of a WLAN system.

BSSs illustrated in FIG. 2 are infrastructure BSSs. Each infrastructure BSS includes one or more STAs and one or more APs. In the infrastructure BSS, communication between non-AP STAs is basically conducted via an AP. However, if a direct link is established between the non-AP STAs, direct communication between the non-AP STAs may be performed.

As illustrated in FIG. 2, the multiple infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

Based on the above, a method of channel bonding in the WLAN system will be described.

1-2 Channel Bonding in WLAN System

Figure 3:
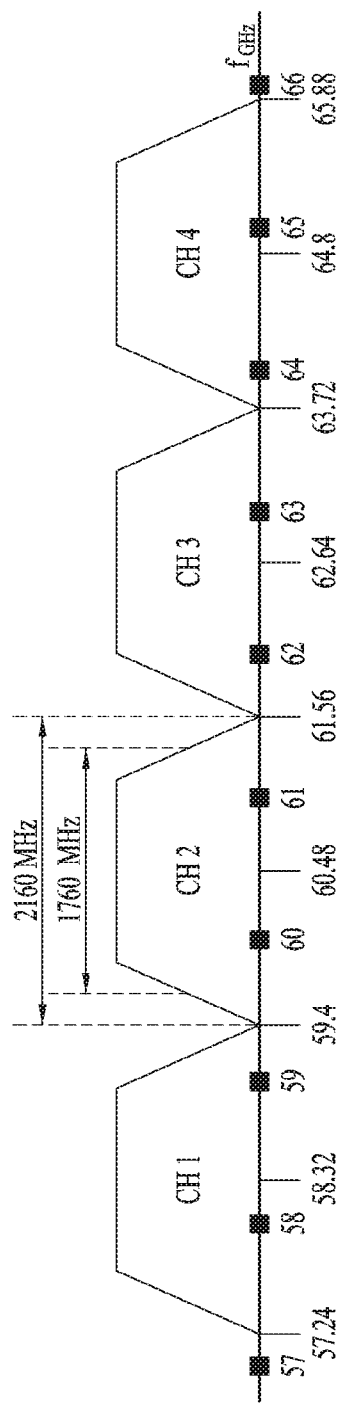
FIG. 3 is a diagram illustrating a channel in a 60 GHz band for explaining a channel bonding operation according to an embodiment of the present invention.

FIG. 3 is a diagram illustrating a channel in a 60 GHz band for explaining a channel bonding operation according to an embodiment of the present invention.

As shown in FIG. 3, four channels may be configured in the 60 GHz band, and the typical channel bandwidth may be 2.16 GHz. The ISM band (57 GHz to 66 GHz) available at 60 GHz may be specified differently for different countries. In general, channel 2 of the channels shown in FIG. 3 is available in all regions and may be used as a default channel. Most of the regions, except Australia, may use channels 2 and 3, which may be utilized for channel bonding. However, the channels used for channel bonding may vary, and the present invention is not limited to a specific channel.

Figure 4:
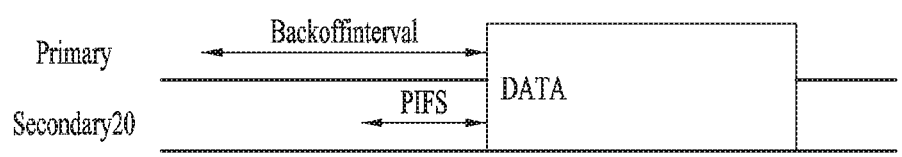
FIG. 4 illustrates a basic method of performing channel bonding in a WLAN system.

FIG. 4 illustrates a basic method of performing channel bonding in a WLAN system.

The example of FIG. 4 illustrates the operation of 40 MHz channel bonding performed by combining two 20 MHz channels in the IEEE 802.11n system. For IEEE 802.11ac, 40/80/160 MHz channel bonding may be performed.

The two channels exemplarily shown in FIG. 4 include a primary channel and a secondary channel, and the STA may review the channel status of the primary channel of the two channels in the CSMA/CA manner. If the secondary channel is idle for a predetermined time (e.g., PIFS) while the primary channel is idle during a certain backoff interval and the backoff count becomes 0, the STA may transmit data by bonding the primary channel and the secondary channel.

In the case where channel bonding is performed based on contention as shown in FIG. 4, channel bonding is allowed only when the secondary channel remains idle for a predetermined time at the time when the backoff count for the primary channel expires, and therefore the application of channel bonding is very limited, and it is difficult to flexibly cope with the media situation.

Accordingly, in one aspect of the present invention, an AP may transmit scheduling information to STAs to perform access based on scheduling. Meanwhile, in another aspect of the present invention, channel access may be performed based on the above-described scheduling or on contention independently of the above-described scheduling. In yet another aspect of the present invention, communication may be performed based on beamforming using a spatial sharing technique.

1-3. Beacon Interval Configuration

Figure 5:
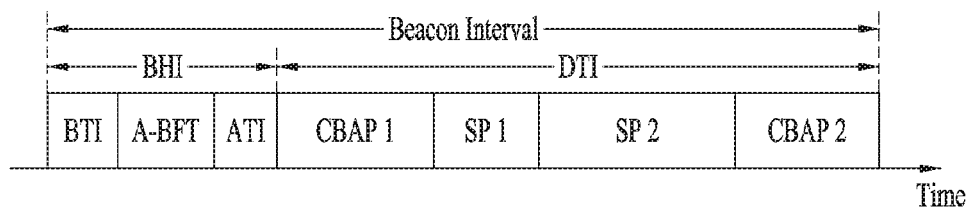
FIG. 5 is a diagram illustrating configuration of a beacon interval.

FIG. 5 is a diagram illustrating configuration of a beacon interval.

In 11ad-based DMG BSS systems, the media time may be divided into beacon intervals. The sub-intervals within a beacon interval may be referred to as access periods. Different access intervals within one beacon interval may have different access rules. The information on the access intervals may be transmitted to a non-AP STA or a non-PCP by the AP or Personal Basic Service Set Control Point (PCP).

As shown in FIG. 5, one beacon interval may include one beacon header interval (BHI) and one data transfer interval (DTI). The BHI may include a beacon transmission interval (BTI), an association beamforming training (A-BFT) interval, and an announcement transmission interval (ATI) as shown in FIG. 4.

The BTI refers to an interval during which one or more DMG beacon frames may be transmitted. The A-BFT interval refers to an interval during which beamforming training is performed by an STA that has transmitted the DMG beacon frame during the preceding BTI. The ATI refers to a request-response-based management access interval between a PCP/AP and a non-PCP/non-AP STA.

Meanwhile, the data transfer interval (DTI) is an interval during which frame exchange is performed between STAs, and may be allocated one or more Contention Based Access Periods (CBAPs) and one or more service periods (SPs) as shown in FIG. 5. Although FIG. 5 illustrates an example of allocation of two CBAPs and two SPs, this is illustrative and not restrictive.

Hereinafter, the physical layer configuration in a WLAN system to which the present invention is applied will be described in detail.

1-4. Physical Layer Configuration

It is assumed that the following three different modulation modes may be provided in the WLAN system according to an embodiment of the present invention.

TABLE 1

| PHY | MCS | Note |
| --- | --- | --- |
| Control PHY | 0 | |
| Single carrier PHY (SC PHY) | 1 . . . 12 25 . . . 31 | (low power SC PHY) |
| OFDM PHY | 13 . . . 24 | |

Such modulation modes may be used to satisfy different requirements (e.g., high throughput or stability). Depending on the system, only some of these modes may be supported.

Figure 6:
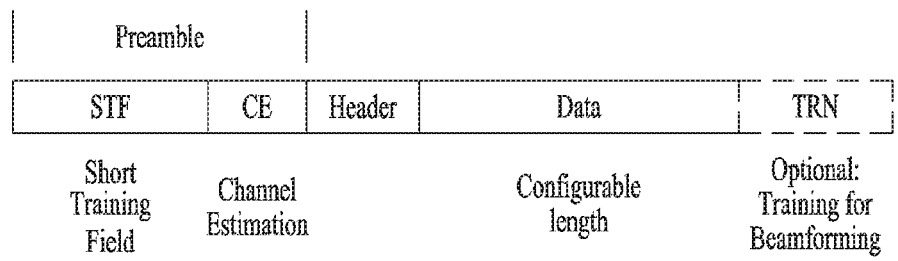
FIG. 6 is a diagram illustrating a physical configuration of an existing radio frame.

FIG. 6 is a diagram illustrating a physical configuration of an existing radio frame.

It is assumed that all the Directional Multi-Gigabit (DMG) physical layers include fields as shown in FIG. 6 in common. However, depending on the respective modes, physical layers may have a different method of defining individual fields and use a different modulation/coding scheme.

As shown in FIG. 6, the preamble of a radio frame may include a Short Training Field (STF) and Channel Estimation (CE). In addition, the radio frame may include a header and a data field as payload, and selectively include a TRN (Training) field for beamforming.

Figure 7:
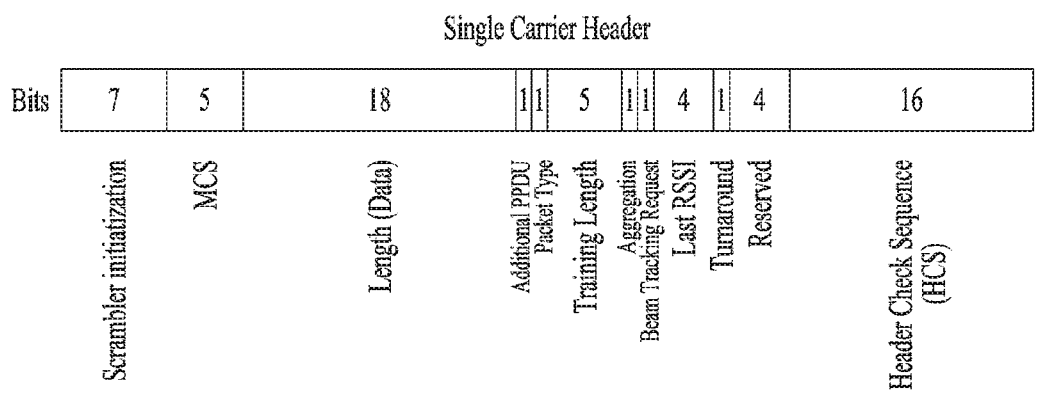
FIGS. 7 and 8 are diagrams illustrating configuration of the header field of the radio frame of FIG. 6.
Figures 8, 9:
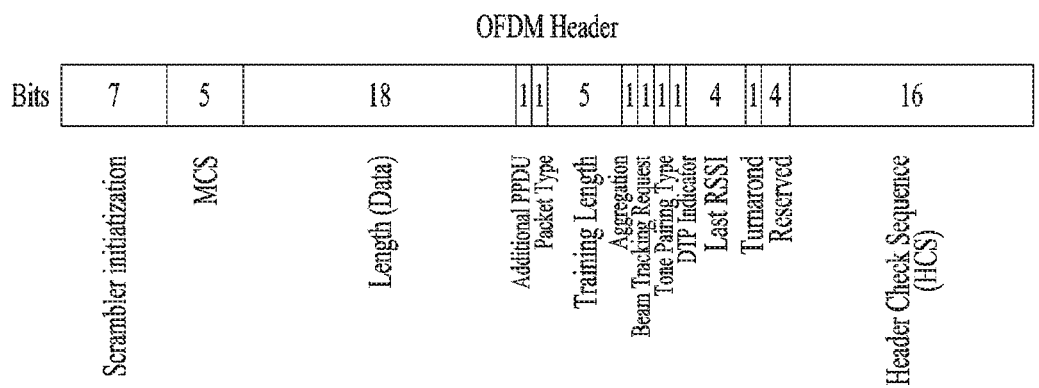
FIG. 9 is a diagram showing a PPDU structure applicable to the present invention.

FIGS. 7 and 8 are diagrams illustrating configuration of the header field of the radio frame of FIG. 6.

Specifically, FIG. 7 illustrates a case where an Single Carrier (SC) mode is used. In the SC mode, the header may include information indicating an initial value of scrambling, a Modulation and Coding Scheme (MCS), information indicating the length of data, information indicating the presence or absence of an additional Physical Protocol Data Unit (PPDU), a packet type, a training length, an aggregation status, a beam tracking request status, a last Received Signal Strength Indicator (RSSI), a truncation status, and a Header Check Sequence (HCS). In addition, as shown in FIG. 7, the header has 4 reserved bits. The reserved bits may be utilized in the following description.

FIG. 8 specifically illustrates configuration of a header in a case where the OFDM mode is applied. The OFDM header may include information indicating an initial value of scrambling, an MCS, information indicating the length of data, information indicating the presence or absence of additional PPDU, a packet type, a training length, an aggregation status, a beam tracking request status, a last RSSI, a truncation status, and an HCS. In addition, as shown in FIG. 8, the header has 2 reserved bits. The reserved bits may be utilized in the following description as in the case of FIG. 7.

As described above, the IEEE 802.11ay system is considering introduction of channel bonding and MIMO technology in the legacy 11ad system for the first time. In order to implement channel bonding and MIMO in 11ay, a new PPDU structure is needed. In other words, the existing 11ad PPDU structure has limitations in supporting legacy UEs and implementing channel bonding and MIMO.

For this, a legacy preamble for supporting a legacy UE and a new field for a 11ay UE following a legacy header field may be defined, and channel bonding and MIMO may be supported through the newly defined field.

FIG. 9 is a diagram showing a PPDU structure according to a preferred embodiment of the present invention. In FIG. 9, the abscissa may correspond to the time domain, and the ordinate may correspond to the frequency domain.

When two or more channels are bonded, a frequency band (for example, a 400 MHz band) may exist between frequency bands (e.g., 1.83 GHz) used in the respective channels. In the mixed mode, a legacy preamble (legacy STF, legacy CE) is transmitted in duplicate through each channel. In an embodiment of the present invention, transmitting the new STF and CE field (gap filling) preamble through the 400 MHz band between the channels along with transmission of the legacy preamble may be considered.

In this case, as shown in FIG. 9, in the PPDU structure according to the present invention, ay STF, ay CE, ay header B, and payload are transmitted over broadband after a legacy preamble, a legacy header and an ay header A. Therefore, the ay header, ay Payload field, and the like to be transmitted after the header field may be transmitted through channels used for channel bonding. In order to distinguish the ay header from the legacy header, the ay header may be referred to as an enhanced directional multi-gigabit (EDMG) header, or "ay header" and "EDMG header" may be interchangeably used.

For example, a total of six or eight channels (2.16 GHz) may be present in 11ay, and up to four channels may be bonded and transmitted to a single STA. Thus, the ay header and the ay payload may be transmitted over bandwidths of 2.16 GHz, 4.32 GHz, 6.48 GHz, and 8.64 GHz.

Alternatively, the PPDU format used when the legacy preamble is repeatedly transmitted without performing the gap-filling described above may also be considered.

In this case, the gap-filling is not performed, and thus the ay STF, ay CE, and ay header B may be transmitted in a wideband after the legacy preamble, legacy header, and ay header A, without the GF-STF and GF-CE field indicated by the dotted line in FIG. 9.

2. Multi-Channel Operation According to Present Invention 2-1. Scheduling Through Beacon or Announcement (Announce) Frame Based on the above discussion, operation methods for an 11ay STA and a PCP/AP when at least one channel except a primary channel is allocated to the 11ay STA will be described in detail in the present invention. In the following detailed description of the present invention, '11ay STA' means a device (e.g., UE, STA, AP, etc.) capable of supporting the 802.11ay system proposed in the present invention. In addition, even when 'Hay STA' operates in other systems, it could be interpreted as a device capable of implementing all the features proposed in the present invention. That is, in the following description, '11ay STA' can be used as a term indicating devices with the aforementioned features.

Figure 10:
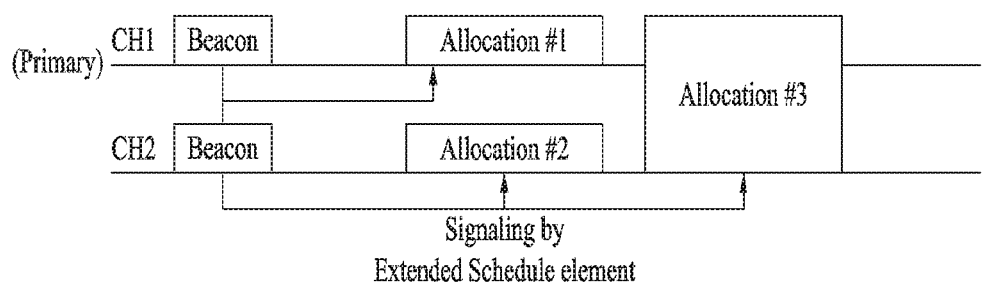
FIGS. 10 and 11 are diagrams illustrating a multi-channel operation applicable to the present invention.
Figure 11:
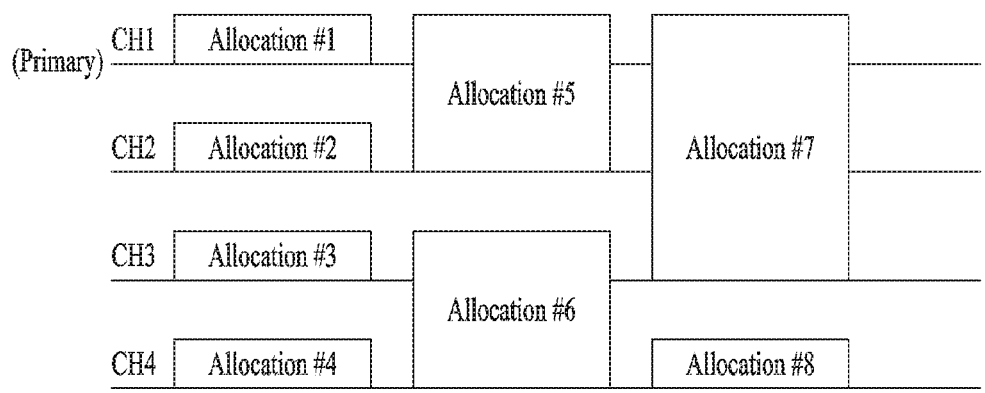

FIGS. 10 and 11 are diagrams illustrating a multi-channel operation according to the present invention.

As shown in FIG. 10, periods of Allocation #1 to #3 can be allocated to an STA through a beacon or announcement (announce) message. The beacon message can be transmitted through not only a primary channel, CH1 but also a secondary channel, CH2. In some cases, to reduce signal overhead, the beacon message may be transmitted through only the primary channel, CH1. In FIG. 10, Allocation #1 to #3 mean allocation periods allocated to each STA, and a CBAP or an SP may be applied to each of the allocation periods according to an embodiment. In FIG. 11, Allocation #1 to #8 mean allocation periods allocated to each STA, and a CBAP or an SP may be applied to each of the allocation periods.

In this case, among a plurality of channels provided by the system, at least one channel may be allocated to each STA according to the channel bonding capability or channel environment of each STA, and the primary channel of the system may not be included in the at least one channel. In this case, the number of the plurality of channels may be set to 6 or 8.

However, if the at least one channel except the primary channel is allocated to STAs like Allocation #2 of FIG. 10 and Allocation #2 to #4, #6, and #8 of FIG. 11, the STAs may be unable to use the primary channel of the system, CH1, and thus, it is necessary to establish a configuration for using a separate channel as a primary channel during a period in which the at least one channel is allocated. Thus, according to the present invention, a PCP/AP transmits, to each STA, information indicating the separate channel that can be used as the primary channel by the STAs during the period in which the at least one channel except the primary channel of the system, CH1 is allocated to the STAs. In this case, one of the at least one channel may be designated as the separate channel, which can be used as the primary channel during the period in which the at least one channel is allocated.

By doing so, each STA can use, as the primary channel, either the primary channel of the system, CH1 or the separate channel during the period in which the at least one channel is allocated. For example, the STA receiving the allocated channel(s) can decode a preamble part of a PPDU frame through the newly designated primary channel during the allocation period(s) like Allocation #2 of FIG. 10 and Allocation #2 to #4, #6, and #8 of FIG. 11. Alternatively, if the allocation period(s) is a CBAP, the STA may perform a backoff operation through the newly designated primary channel rather than CH1 during the allocation period(s).

In addition, like Allocation #6 of FIG. 11, the STA receiving the allocated multiple channels except the primary channel of the system (i.e., CH1) can transmit data to another STA during the period in which the plurality of channels are allocated by bonding the plurality of channels with reference to the newly designated primary channel rather than the primary channel of the system (i.e., CH1).

Hereinafter, a description will be given of a signaling configuration for operating an PCP/AP and an STA, and a particular operation method based on the signaling configuration will be described.

2-1-1. Addition of New EDMG Operation Element

According to an embodiment of the present invention, a new element, i.e., an EDMG operation element can be added to a body of a management frame (e.g., beacon frame, association frame, etc.), and the management frame can be transmitted and received between the PCP/AP and STA, thereby transmitting and receiving primary channel information and secondary channel offset information.

For example, when at least one channel except the primary channel supported by the system is allocated to a specific STA, the PCP/AP may provide information indicating a channel that can be used as the primary channel by transmitting the management frame including the EDMG operation element to the specific STA.

The EDMG operation element may have a structure similar to that of a high throughput (HT) operation element of the 11an or 11ac system. In addition, the EDMG operation element may include a one-octet primary channel field as a field indicating the primary channel information and a two-bit EDMG operation information field including the secondary channel offset information.

2-1-1-1. Signaling Through New Field

For all STAs in a BSS, the PCP/AP can designate one of a plurality of channels as an alternative primary channel through an alternative primary channel field, which is a new field, during multiple beacon intervals in which the signaling result is maintained.

Although Table 2 and Table 3 below show an example of signaling indicating that the total number of channels supported by the system is 4, the total number of the channels can be extended to 4 or 8. That is, the number of bits in bit information indicating the alternative primary channel may be increased according to the total number of channels.

TABLE 2

| Bit n | Bit n + 1 | Description |
|---|---|---|
| 0 | 0 | Alternative primary channel = original primary channel |
| 0 | 1 | Alternative primary channel = (the number of original primary channel + 1) mod 4 |
| 1 | 1 | Alternative primary channel = (the number of original primary channel + 2) mod 4 |
| 1 | 0 | Alternative primary channel = (the number of original primary channel + 3) mod 4 |

TABLE 3

| Bit n | Bit n + 1 | Description |
|---|---|---|
| 0 | 0 | Channel 1 is alternative primary channel |
| 0 | 1 | Channel 2 is alternative primary channel |
| 1 | 1 | Channel 3 is alternative primary channel |
| 1 | 0 | Channel 4 is alternative primary channel |

2-1-1-2. Determination of Selection Rule of Alternative Primary Channel

Unlike section 2-1-1-1, the alternative primary channel can be configured during the period in which the at least one channel is allocated, by defining a selection rule of the alternative primary channel as follows without addition of the new field compared to the conventional system. In the following description, it is assumed that the total number of channels supported by the system is 4, but the total number of channels may be set to 6, 8 or greater depending on embodiments. In other words, the selection rule can be modified.

When channels 1 and 2 are the primary channel, the alternative primary channel is channel 3.

When channels 3 and 4 are the primary channel, the alternative primary channel is channel 2.

Alternative primary channel=(The number of primary channel+2) mod 4

The above flexible channel allocation and alternative primary channel signaling may be performed on a basis of the EDMG operation element in the body of the beacon or announcement (announce) frame.

Figure 12:
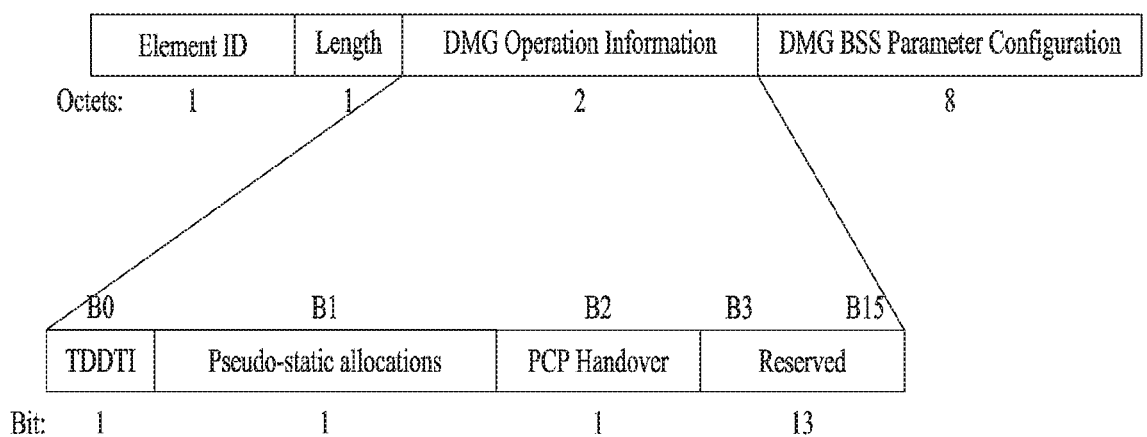
FIG. 12 is a diagram illustrating a signaling configuration applicable to the present invention.

2-1-2. Modification of DMG Operation Element According to Existing 11Ad System According to another embodiment of the present invention, the PCP/AP can support a multi-channel operation of the STA using the existing DMG operation element included in the body of the management frame (e.g., beacon frame, association frame, etc.) of the 11ad system. As shown in FIG. 12, a DMG operation information field may include 13 reserved bits. Through these reserved bits, information on at least one channel allocated to the STA, information on an allocation period in which the at least one channel is allocated, information on a primary channel during the allocation period can be signaled.

In this case, whether the period in which the at least one channel is allocated is 'SP allocation out of primary channel' or 'CBAP allocation out of primary channel' can be indicated to each STA through an allocation type field in an extended schedule element. By doing so, each STA can know whether the system performs a channel access scheme based on at least one channel except the pre-configured primary channel during the DTI.

In this case, as a signaling method, methods in Tables 2 and 3 can be applied in a similar manner

Figure 13:
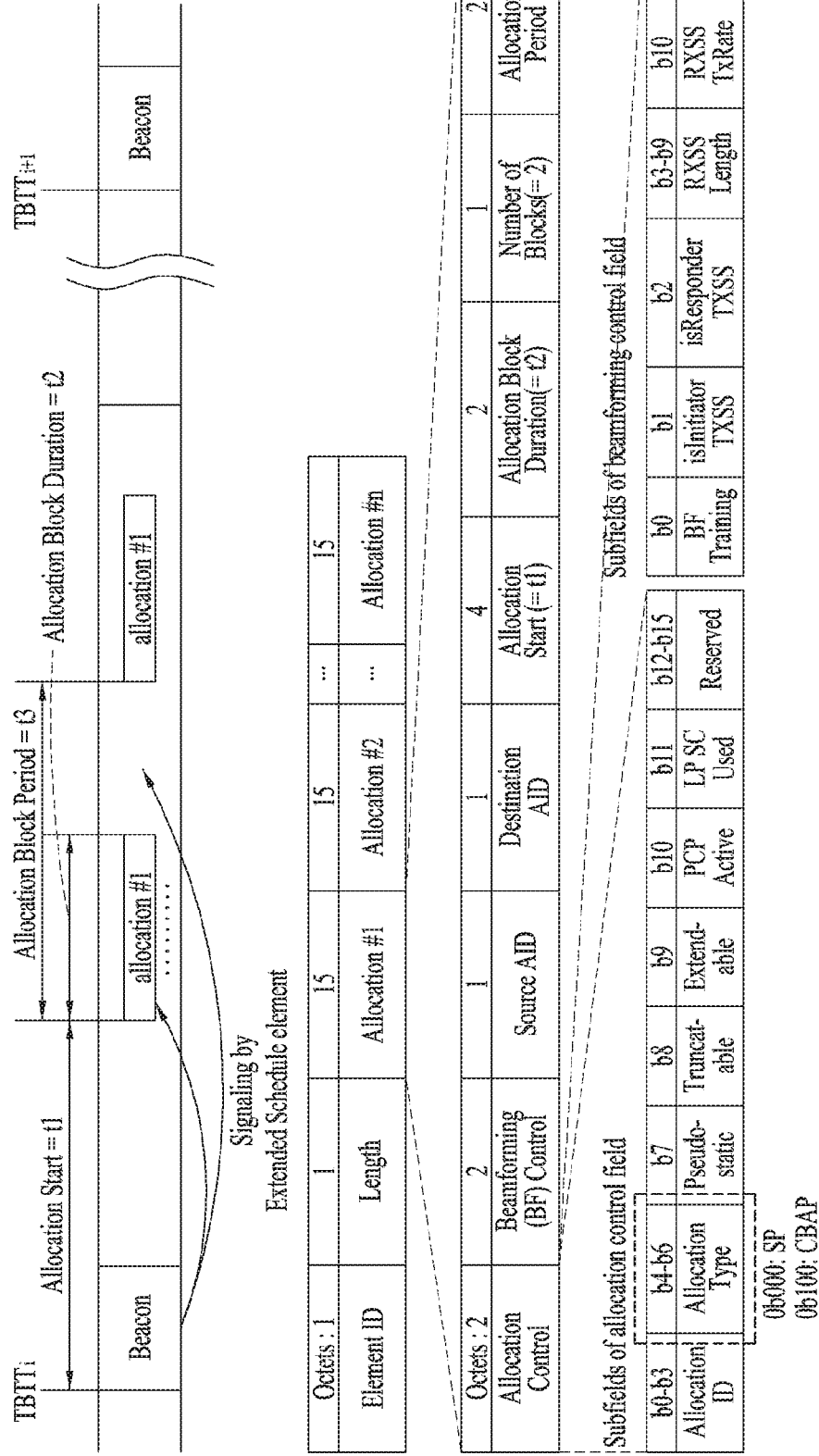
FIG. 13 is a diagram illustrating an extended schedule element included in a beacon frame body or an announcement (announce) frame body of the 11ad system.

2-1-3. Designation of Alternative Primary Channel within Extended Schedule Element FIG. 13 is a diagram illustrating an extended schedule element included in a beacon frame body or an announcement (announce) frame body of the 11ad system. Referring to FIG. 13, the PCP/AP allocates the CBAP and/or the SP corresponding to the channel access scheme during the DTI to DMG STAs through an allocation field of the extended schedule element. The allocation field includes an allocation control subfield, and the allocation control subfield includes a reserved subfield with a length of 4 bits.

According to an embodiment of the present invention, the alternative primary channel can be informed as follows using 2-bit information among reserved bits included in the extended schedule element.

TABLE 4

| Bit 12 | Bit 13 | Description |
| --- | --- | --- |
| 0 | 0 | Alternative primary channel = original primary channel |

TABLE 4-continued

| Bit 12 | Bit 13 | Description |
| --- | --- | --- |
| 0 | 1 | Alternative primary channel = (the number of original primary channel + 1) mod 4 |
| 1 | 1 | Alternative primary channel = (the number of original primary channel + 2) mod 4 |
| 1 | 0 | Alternative primary channel = (the number of original primary channel + 3) mod 4 |

TABLE 5

| Bit 12 | Bit 13 | Description |
| --- | --- | --- |
| 0 | 0 | Channel 1 is alternative primary channel |
| 0 | 1 | Channel 2 is alternative primary channel |
| 1 | 1 | Channel 3 is alternative primary channel |
| 1 | 0 | Channel 4 is alternative primary channel |

In this way, the flexible channel allocation can be performed on a basis of the allocation field, and the alternative primary channel may be changed according to the allocation field.

As another embodiment, an allocated bandwidth can be informed each STA as follows using 2-bit information of the reserved subfield of the extended schedule element.

TABLE 6

| Bit 14 | Bit 15 | Description |
| --- | --- | --- |
| 0 | 0 | Bandwidth is 2.16 GHz |
| 0 | 1 | Bandwidth is 4.32 GHz |
| 1 | 1 | Bandwidth is 6.48 GHz |
| 1 | 0 | Bandwidth is 8.64 GHz |

In this case, the bandwidth of one channel is assumed to be 2.16 GHz. In addition, channels allocated to each STA may be configured or selected in advance to indicate the bandwidth information as described above.

As a further embodiment, the PCP/AP or a non-PCP/AP STA can provide information on the channel bonding capability through an EDMG capabilities element included in the body of the management frame (e.g., beacon frame, association frame, etc.). More specifically, when a supported channel width set capable of supporting the EDMG capabilities element is provided, the PCP/AP or non-PCP/AP STA can provide information on its own channel bonding capability.

In addition, the PCP/AP or non-PCP/AP STA can provide information on the MIMO and OFDMA capabilities by adding a new field to the EDMG capabilities element.

Moreover, by adding an available multichannel access field to the EDMG capabilities element included in the body of the management frame (e.g., beacon frame, association frame, etc.), the PCP/AP or non-PCP/AP STA can inform whether the corresponding PCP/AP or non-PCP/AP STA has a capability of supporting access to other channels except the primary channel (or operating channel) during the DTI That is, through the above-described various methods, the STA can operate with respect to the separately configured primary channel (e.g., alternative primary channel) during the period in which the at least one channel is allocated through the above-described various methods even when the at least one channel except the primary channel predetermined by the system is allocated.

In this case, when the period in which the at least one channel is allocated ends, the STA can operate with respect to the primary channel predetermined by the system instead of the separately configured primary channel (e.g., alternative primary channel). To this end, the STA may use a duration-related field in the extended schedule element. In other words, after the end of the allocation period, the STA may operate with respect to the primary channel predetermined by the system, using the duration-related field. For example, the duration-related field in the extended schedule element may include an allocation start field, an allocation block duration field, a number of blocks field, and an allocation block period field.

Alternatively, when the STA receives a beacon frame indicating use of the primary channel predetermined by the system from the PCP/AP after transmitting data to a different STA during the allocation period, the STA may use the primary channel predetermined by the system rather than a channel designated as the alternative primary channel.

Alternatively, when completing the data transmission to the different STA, the STA may immediately use the primary channel predetermined by the system even though the allocation period does not end.

2-1-4. Details of Operation Configuration

Figure 14:
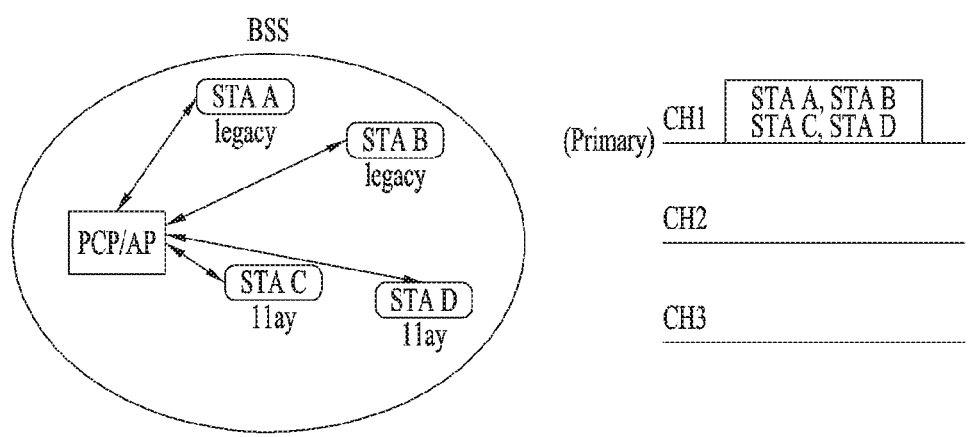
FIGS. 14 to 16 are diagrams illustrating operation methods for an access point (AP) and an STA applicable to the present invention.
Figure 15:
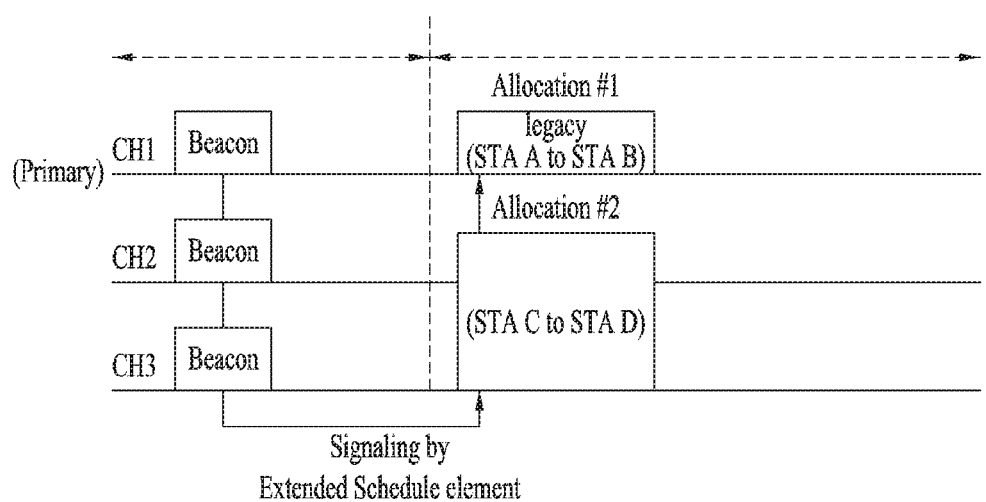
Figure 16:
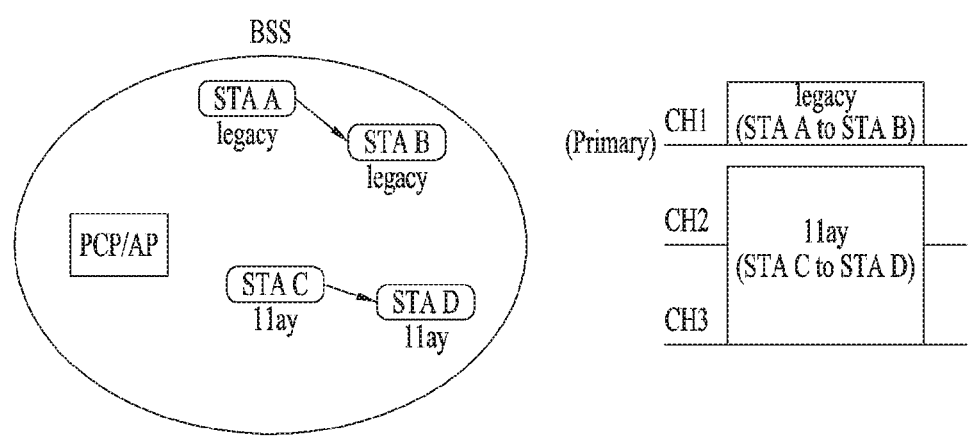

Hereinafter, a description will be given of operation when an STA according to the present and an STA supported by the conventional 11ad system coexist within one BSS. In FIGS. 14 to 16, the STA supported by the 11ad system is denoted as 'legacy' and the STA according to the present invention is denoted as '11ay'. That is, each of STA A and STA B are the legacy STA, and each of STA C and STA D are the 11ay STA.

As shown in FIG. 14, legacy STAs and 11ay STAs creates a BSS using the primary channel supported by the system as an operating channel during a BSS establishment or association process.

The legacy STA creates a link with the PCP/AP through the DMG operation element and DMG capabilities element. On the other hand, the 11ay STA can create a link with the PCP/AP by modifying the reserved bits included in DMG operation element and DMG capabilities element, which are defined in the conventional system, or defining the new EDMG operation element and EDMG capabilities element as described above.

Thereafter, the PCP/AP can check whether the 11ay STA can support the multi-channel operation through a negotiation process.

In addition, the 11ay STA can receive information on the primary channel and information on secondary channels through the DMG operation element and EDMG operation element while establishing the link with the PCP/AP.

As shown in FIG. 15, the PCP/AP can allocate at least one channel to each STA through the extended schedule element after establishing the link with each STA. For example, the PCP/AP may allocate the predetermined primary channel, CH1 to the legacy STA(s) and allocate CH2 and CH3 except CH1 to the 11ay STA(s) to prevent collisions between the legacy STA(s) and 11ay STA(s).

In this case, since the channels allocated to the 11ay STA does not include the primary channel predetermined by the system, CH1, the PCP/AP provides information indicating a channel used as a primary during a period in which CH2 and CH3 are allocated to the 11ay STA through the extended schedule element. To this end, the reserved bit information in the allocation control subfield of each allocation field in the extended schedule element may be used as described above.

As shown in FIG. 16, flay STAs and legacy STAs transmit and receive data or frames through allocated channels during the DTI. For example, STA A corresponding to the legacy STA transmits data to STA B through CH1, and STA C corresponding to the 11ay STA may transmit data to STA D through CH2 and CH3. In this case, if one of the CH2 and CH3 is busy, STA C may transmit data using one of them.

Specifically, STA C, which is the 11ay STA, uses CH2 or CH3 as the primary channel during the allocation period shown in FIG. 16. For example, if the PCP/AP transmits, to STA C, information indicating that CH2 will be used as the primary channel during the allocation period, the STA C may combine CH2 and CH3 with respect to CH2 and then transmit data to STA D. In addition, if the period allocated to STA C is the CBAP, STA C may perform a backoff procedure using CH2 and then decode a preamble of a PPDU frame.

Additionally, when STA C transmits data to STA D, an AID of STA C may be included in a source AID subfield of a specific allocation field of the extended schedule element transmitted from the PCP/AP to STA C and STA D, and an AID of STA D may be included in a destination AID subfield of the specific allocation field. In this case, a broadcast AID may be applied to each AID subfield, or a group ID of each STA may be applied.

In addition, whether the period allocated to STA C and STA D is the CBAP or SP may be informed through 'allocation type' in an allocation control field of the specific allocation field.

2-2. Dynamic Allocation Through Grant Frame

Hereinafter, a method for enabling a PCP/AP or separate STA that has a dynamic allocation capability to dynamically allocate at least one channel by transmitting a grant frame to at least one STA during a DTI will be described.

In this case, since the legacy STA cannot decode the grant frame proposed in the present invention or newly proposed fields in the grant frame, the primary channel should be used in channel allocation for the legacy STA. On the other hand, an STA (e.g., 11ay STA) supporting the 11ay system proposed in the present invention can decode the grant frame proposed in the present invention, and thus, not only the primary channel of the system but also other channels can be allocated to the STA. Hereinafter, an STA capable of performing operations proposed in the present invention is referred to as the 11ay STA for convenience of description.

2-2-1. Dynamic Allocation Process

Figure 17:
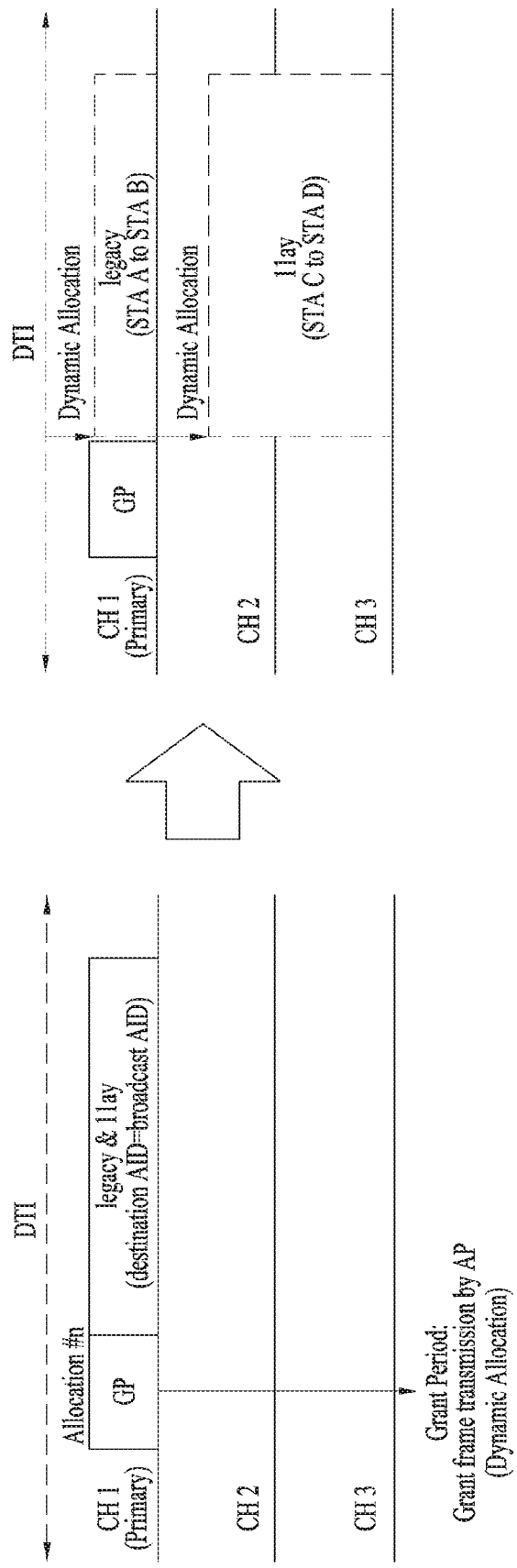
FIG. 17 is a diagram schematically illustrating an operation for dynamically allocating at least one channel through a grant frame according to an embodiment of the present invention.

FIG. 17 is a diagram schematically illustrating an operation for dynamically allocating at least one channel through a grant frame according to an embodiment of the present invention.

As shown in FIG. 17, a PCP/AP or separate STA can dynamically allocate a predetermined length of allocation period to at least one STA during a DTI by transmitting a grant frame to the at least one STA during the DTI.

The grant frame may be transmitted during the DTI, and in the present invention, a period in which the grant frame is transmitted is named a grant period (GP).

In the case of the aforementioned scheduling operation based on the beacon or announcement (announce) frame, the PCP/AP performs the scheduling operation during the DTI, which appears after a BHI, based on the beacon or announcement (announce) frame transmitted during the BHI. That is, considering that the beacon or announcement (announce) frame is transmitted during the BHI, it is difficult to efficiently control the scheduling operation during the DTI.

On the other hand, considering that the grant frame is transmitted during the DTI and the predetermined length of allocation period can be allocated to the at least one STA, channel allocation can be performed flexibly compared to the case in which the beacon or announcement (announce) frame is used.

As described above, the period in which the grant frame is transmitted is referred to as the grant period (GP). That is, the GP is included in the DTI, and as shown in FIG. 17, the GP may be included in an allocation period (allocation # n of FIG. 17) configured through the beacon or announcement (announce) frame.

As another embodiment, although the GP may be included in an ATI included in the BHI, it is preferred that the GP is included in the DTI for more flexible channel allocation.

The grant frame may be transmitted through the primary channel of the system, CH1. After receiving the grant frame, the at least one STA may be allocated the predetermined length of the allocation period.

To this end, the PCP/AP or separate STA may set a destination AID of the grant frame as a broadcast AID and then broadcast the broadcast AID to neighboring STAs. However, this is merely an example, and the destination AID may be set as an AID of an STA that intends to transmit the grant frame, a specific group AID, or a partial AID.

In addition, considering that the 11ay system proposed in the present invention supports the multi-channel operation, a plurality of dynamic allocation periods can be allocated through a single GP. To this end, the following methods can be considered.

(1) The PCP/AP or separate STA transmits a plurality of pieces of dynamic allocation information in accordance with the number of pieces of dynamic allocation in a specific GP. To this end, the PCP/AP or separate STA may transmit a plurality of grant frames during the GP.

For example, information on first allocation is contained in a first grant frame transmitted by the PCP/AP or separate STA. In this case, the PCP/AP or separate STA may transmit the first grant frame to only a source STA. Alternatively, the PCP/AP or separate STA may transmit the grant frame including the information on the first allocation twice to transmit the frame to the source STA and a destination STA. Thereafter, information on second allocation may be included in a second grant frame transmitted by the PCP/AP or separate STA.

As described above, the PCP/AP or separate STA can transmit a grant frame to a source STA and a destination STA per allocation, and the number of grant frames transmitted per allocation may be configured independently.

(2) A plurality of pieces of allocation can be performed by generating GPs as many as the number of pieces of dynamic allocation.

It is possible to separately form at least one GP for the 11ay system while maintaining the legacy GP defined in the conventional 11ad system. The PCP/AP or separate STA may perform dynamic channel allocation for the 11ay STA through the separately formed GP.

In addition, the PCP/AP or separate STA may allocate the CBAP or SP to at least one STA through a grant frame. In this case, it is possible to apply an individual grant frame or a broadcast grant frame.

After receiving the grant frame through the primary channel determined by the system, CH1, the legacy or 11ay STA decodes the grant frame and then determines whether the grant frame contains dynamic allocation information for each STA. When the grant frame contains dynamic allocation information for a specific STA, the specific STA can transmit and receive data or signals to and from another STA through at least one channel indicated by the dynamic allocation information during an allocation period indicated by the dynamic allocation information.

More specifically, in the case of legacy STAs operating on only the primary channel (e.g., STA A or STA B in FIG. 17), a predetermined length of dynamic allocation period, which appears after the GP, can be allocated through the grant frame, and the legacy STAs may transmit and receive signals therebetween during the dynamic allocation period.

Alternatively, in the case of 11ay STAs capable of operating on a plurality of channels (e.g., STA C or STA D in FIG. 17), CH2 and CH3, which are not the primary channel, can be allocated through the grant frame, and the 11ay STAs may transmit and receive signals therebetween during the dynamic allocation period indicated by the grant frame by bonding or aggregating CH2 and CH3.

Figure 18:
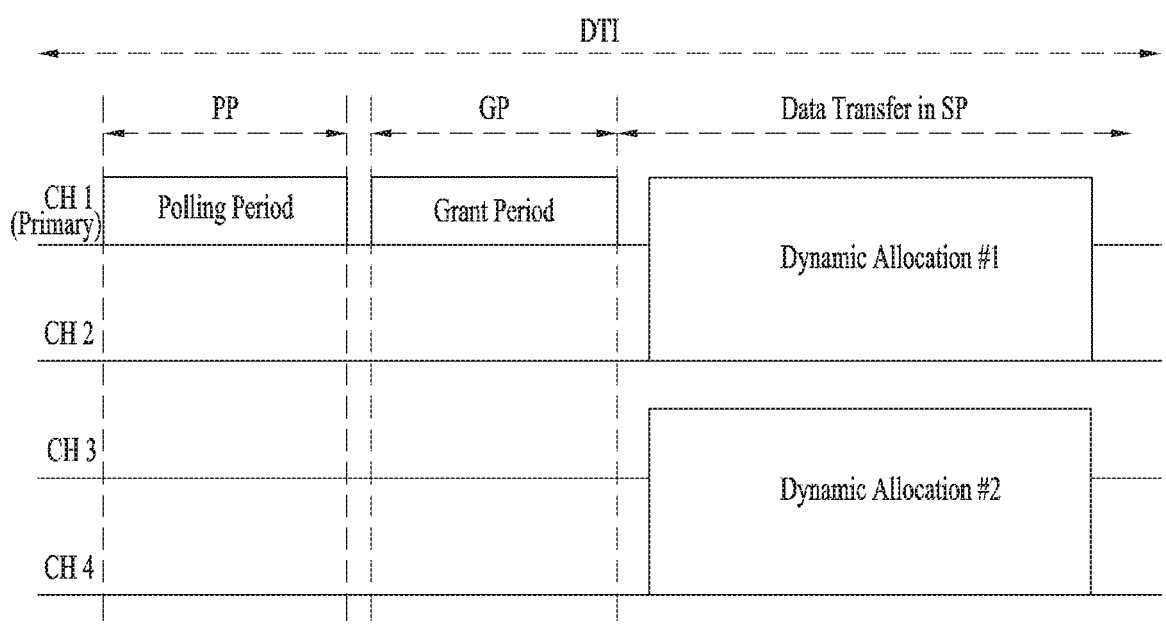
FIGS. 18 to 20 are diagrams schematically illustrating an operation for dynamically allocating at least one channel through a grant frame according to another embodiment of the present invention.
Figure 19:
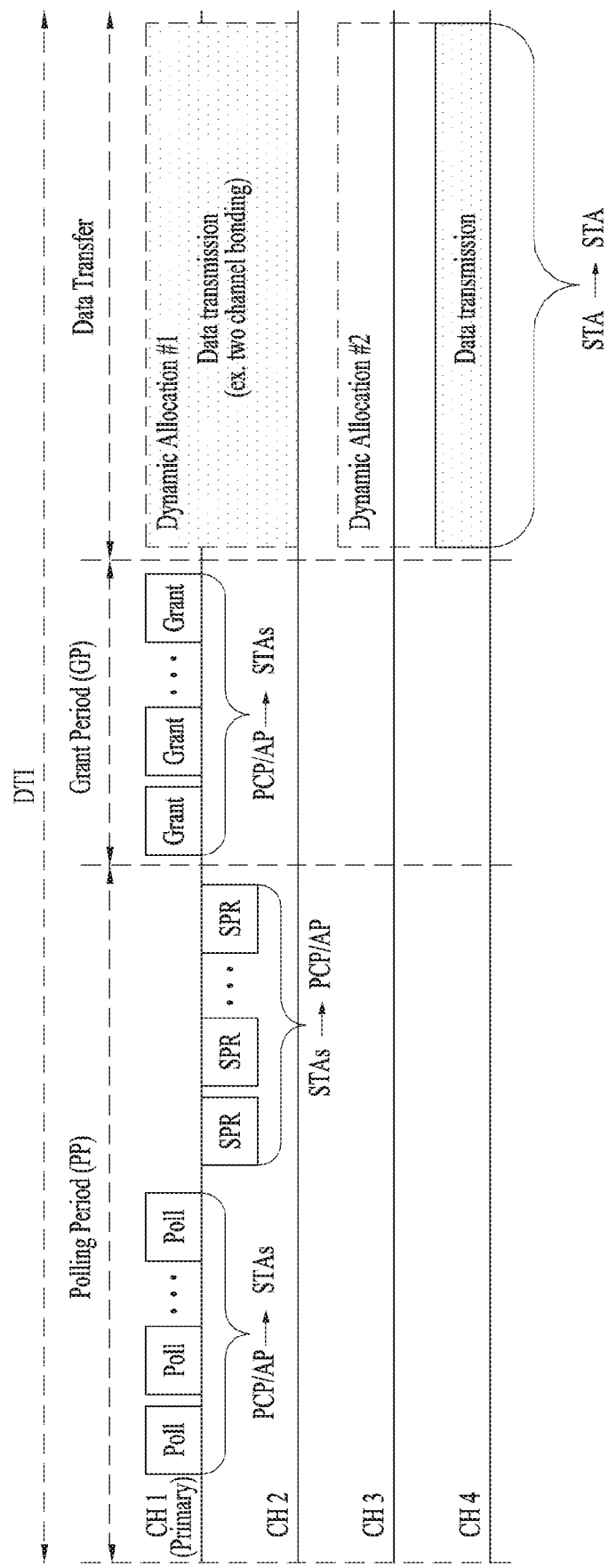
Figure 20:
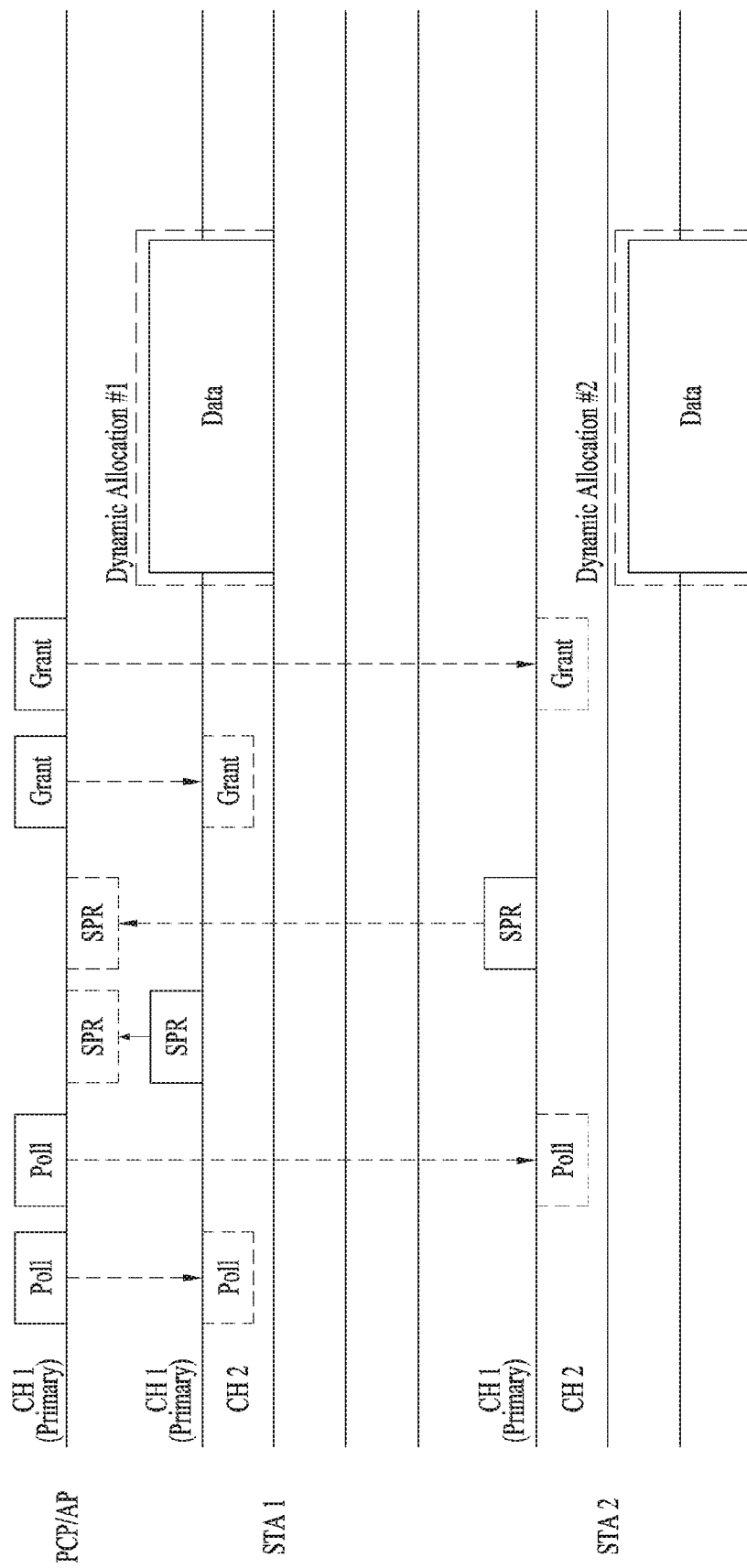

FIGS. 18 to 20 are diagrams schematically illustrating an operation for dynamically allocating at least one channel through a grant frame according to another embodiment of the present invention.

As shown in FIG. 18, the DTI according to the present invention can be mainly divided into: a polling period (PP); a grant period (GP); and an allocation period.

The PP means a period in which a PCP/AP or separate STA performs polling on whether dynamic allocation is present during the DTI by transmitting a poll frame to at least one STA and then receive a service period request (SPR) frame from the at least one STA. In this case, as shown in FIGS. 19 and 20, the PCP/AP or separate STA may transmit different poll frames to the one or more STAs and then receive SPR frames in response to the poll frames from the one or more STAs.

As described above, after receiving the poll frame from the PCP/AP or separate STA, the specific STA can transmit the SPR frame in response to the poll frame to the PCP/AP or separate STA.

In addition, the at least one STA that receives the poll frame should not mandatorily transmit the SPR frame. That is, the at least one STA can selectively determine whether to transmit the SPR frame.

Additionally, as shown in FIGS. 18 to 20, the PCP/AP or separate STA and the at least one STA can transmit and receive the poll frame and SPR frame through the primary channel of the system. Further, time resources used by the at least one STA to receive and transmit the poll frame and SPR frame may be different from those used by other STAs to receive and transmit poll frames and SPR frames.

In this case, the SPR frame transmitted from each STA may include operating mode information as information on the corresponding STA's capability. The operating mode information according to the present invention may indicate one of a first operating mode of the STA to perform operations such as carrier sensing (CS), RTS/CTS transmission and reception, etc. with respect to the entirety of an allocated channel bandwidth as in the conventional Wi-Fi scheme and a second operation mode of the STA to perform operations such as the CS, etc. with respect to the primary channel determined by the system or the alternative primary channel. In this case, the CS may be CS performed on PHY and MAC layers.

The above-described mode operating information may be transmitted through reserved bits in the SPR frame of the conventional 11ad system or an SPR frame to which a separate trailer is added.

In this case, the transmission and reception of the poll frame and/or SPR frame during the DTI should not be mandatorily performed. Preferably, if an allocation period in which the poll frame, SPR frame, and grant frame are transmitted is the CBAP, the PP may be omitted. On the other hand, if the allocation period in which the poll frame, SPR frame, and grant frame are transmitted is the SP, the poll frame may be transmitted to the at least one STA, and the SPR frame may be received from the at least one STA.

As described above, the GP means a period in which the PCP/AP or separate STA transmits the grant frame to the at least one STA. That is, the PCP/AP or separate STA transmits the grant frame to the at least one STA during the GP.

As shown in FIGS. 19 and 20, the PCP/AP or separate STA can transmit different grant frames to the one or more STAs. In this case, during the PP, the PCP/AP or separate STA may transmit the grant frames to not only STAs that transmit SPR frames but also STAs that do not transmit SPR frames.

In other words, as shown in FIG. 20, the PCP/AP or separate STA may transmit grant frames to one or more STAs (e.g., STA1 and STA2) that transmit SPR frames. In another embodiment, the PCP/AP or separate STA may transmit grant frames to STAs that do not transmit SPR frames.

The allocation period means a period in which data is transmitted and received using at least one channel during a channel period dynamically allocated through the grant frame. Specifically, the allocation period may mean one of (1) a period in which data is transmitted and received through the primary channel of the system; (2) a period in which data is transmitted and received through another channel except the primary channel of the system; (3) a period in which data is transmitted and received through a plurality of channels including the primary channel of the system; and (4) a period in which data is transmitted and received through a plurality of channels except the primary channel of the system, during the channel period dynamically allocated through the grant frame. In this case, to transmit and receive data through the plurality of channels except the primary channel of the system, a method for transmitting and receiving data by bonding or aggregating a plurality of channels may be used.

Moreover, as shown in FIG. 19, the PCP/AP or separate STA may allocate an allocation period corresponding to Dynamic Allocation #1 to a first STA through a grant frame. In this case, Dynamic Allocation #1 may be an allocation period including the primary channel of the system, CH1 and CH2. Thus, the first STA may transmit or receive data through channel bonding of CH1 and CH2 during the allocation period corresponding to Dynamic Allocation #1.

Further, as shown in FIG. 19, the PCP/AP or separate STA may allocate an allocation period corresponding to Dynamic Allocation #2 to a second STA through a grant frame. In this case, Dynamic Allocation #2 may be an allocation period including CH3 and CH4 except the primary channel of the system, CH1. Thus, similar to the first STA, the second STA may transmit or receive data through channel bonding of CH1 and CH2 during the allocation period corresponding to Dynamic Allocation #2. Alternatively, as shown in FIG. 19, even though the allocation period including CH3 and CH4 (i.e., Dynamic Allocation #2) is allocated to the second STA, the second STA may detect a channel which is actually idle through a separate channel sensing (CS) operation and then transmit and receive data through only the idle channel (i.e., CH4 in FIG. 19) among a plurality of allocated channels.

Hereinafter, a description will be given of a CS operation during an allocation period with reference to FIG. 21.

Figure 21:
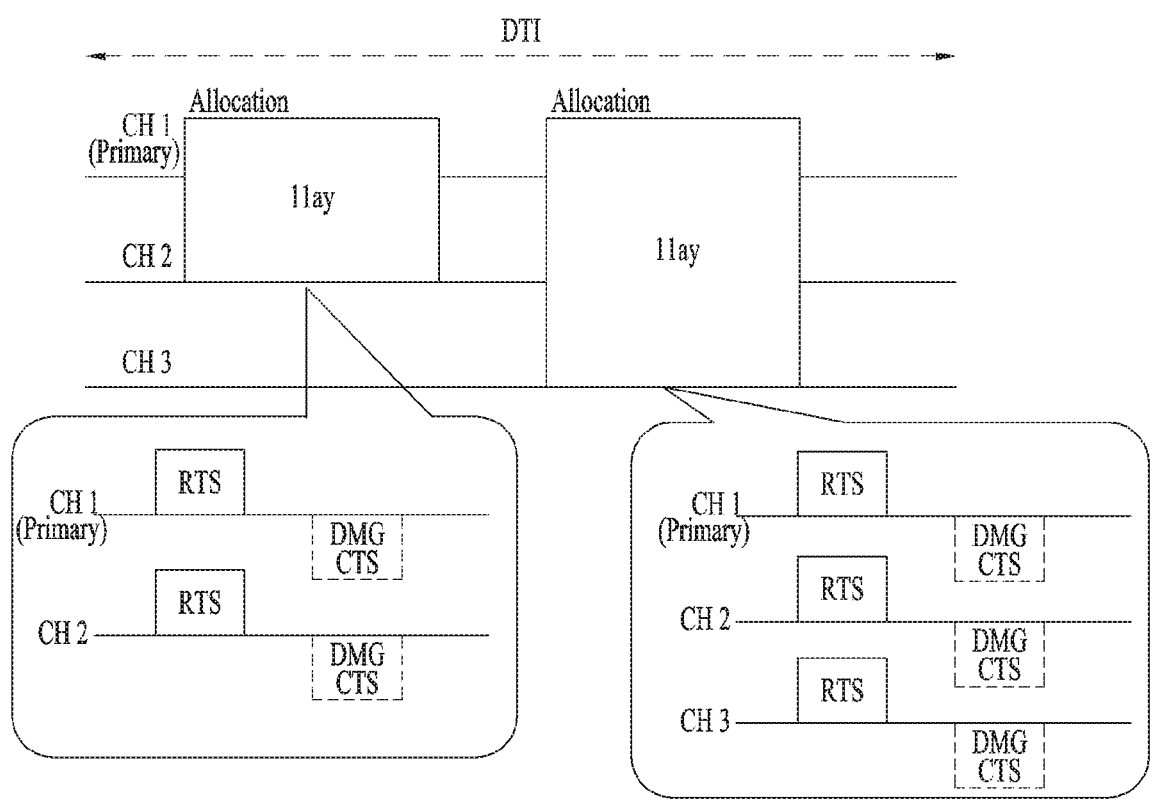
FIG. 21 is a diagram illustrating a configuration for transmitting and receiving ready-to-send (RTS) and clear-to-send (CTS) frames between STAs when a plurality of channels are allocated to the STAs according to an example of the present invention.

FIG. 21 is a diagram illustrating a configuration for a PCP/AP or separate STA to transmit and receive ready-to-send (RTS) and clear-to-send (CTS) frames when a plurality of channels are allocated according to an example of the present invention.

The RTS/CTS mentioned in the present invention is a communication mechanism that can be selectively used in the IEEE 802.11 wireless network protocol. The RTS/CTS may be used to prevent a frame collision which is known as a hidden terminal problem.

To this end, an STA (e.g., a source STA or source node) that intends to perform data or signal transmission transmits an RTS frame. In this case, if there are no other signals currently transmitted and received, i.e., in the case of a wireless environment where the transmission can be performed, an STA (e.g., a destination STA or destination node) that intends to receive data responds by transmitting a CTS frame in response to the RTS frame. By doing so, the two STAs may detect that a channel is in the idle state and then transmit and receive the data.

However, in the related art, a configuration for transmitting and receiving RTS/CTS frames through only a single channel, which is configured as the primary channel of the system has been defined. In particular, a configuration for STAs to transmit and receive RTS/CTS frames with respect to other channels except the primary channel of the system in order to detect whether a specific channel is in the idle state when a plurality of channels are allocated has not been discussed so far.

According to the present invention, each STA can directly detect whether a specific channel is idle by transmitting and receiving RTS/CTS frames with respect to other channels except the primary channel, thereby improving reliability of the data or signal transmission and reception compared to the related art.

More specifically, as shown in FIG. 21, the flay STA according to the present invention can be allocated a plurality of channels during a specific allocation period, which is allocated through the beacon/announcement (announce) frame or the grant frame. In FIG. 21, assuming that a first allocation period is allocated to STA X and a second allocation period is allocated to STA Y, CH1 and CH2 are allocated to STA X during the first allocation period, and CH1, CH2, and CH3 are allocated to STA Y during the second allocation period. Although FIG. 21 shows a case in which a plurality of channels including the primary channel of the system, CH1 are allocated to STA X and STA Y, the present invention can be extensively applied when a plurality of channels except the primary channel of the system, CH1 are allocated to another STA. In other words, CH3 and CH4 may be allocated to STA Z (not shown in the drawing) during a separate allocation period.

Referring to FIG. 21, each of STA X and STA Y can know which channels can be used for transmission, by transmitting and receiving RTS/DMG CTS during an allocation period allocated to each of the STAs. In this case, according to an embodiment, each of STA X and STA Y may be either an STA that intends to transmit data during an allocation period or an STA that intends to receive data during an allocation period. In other words, each of STA X and STA Y may be either an STA that transmits the RTS frame or an STA that transmits the CTS frame. Thus, a description will be given on the assumption that STA X or STA Y is set as a source STA or a destination STA.

Thus, an STA that intends to transmit data in a wide bandwidth including a plurality of channels may transmit an RTS frame for all of the plurality of channels in a duplicate mode. An STA that receives the RTS frame may transmit a (DMG or EDMG) CTS frame through an idle channel after independently performing a CCA check on each channel. After receiving the CTS frame, the STA may transmit data using at least one channel that carries the CTS frame. In particular, when the CTS frame is transmitted through a plurality of channels, the STA may perform channel bonding or channel aggregation on the plurality of channels to transmit data.

In an embodiment applicable to the present invention, both of the source STA and the destination STA operating as described above may be an STA capable of supporting the aforementioned first operating mode (where CCA, RTS/CTS transmission and reception, etc. can be performed with respect to the entirety of the allocated channel bandwidth as in the conventional Wi-Fi scheme).

Additionally, the grant frame may include information indicating operations of a specific STA during a specific dynamic allocation period. For example, the PCP/AP or separate STA may transmit information for instructing the specific STA to operate either the first operating mode or the second operating mode during the specific dynamic allocation period through the grant frame. Thus, after receiving the grant frame, the specific STA may operate based on the operating mode indicated by the grant frame during the allocated dynamic allocation period.

Hereinafter, a grant frame format applicable to the present invention will be described in detail.

2-2-2. Grant Frame Format

Various frame formats can be used as the grant frame format according to the present invention. For example, the grant frame may have a frame format illustrated in FIG. 22.

Figure 22:
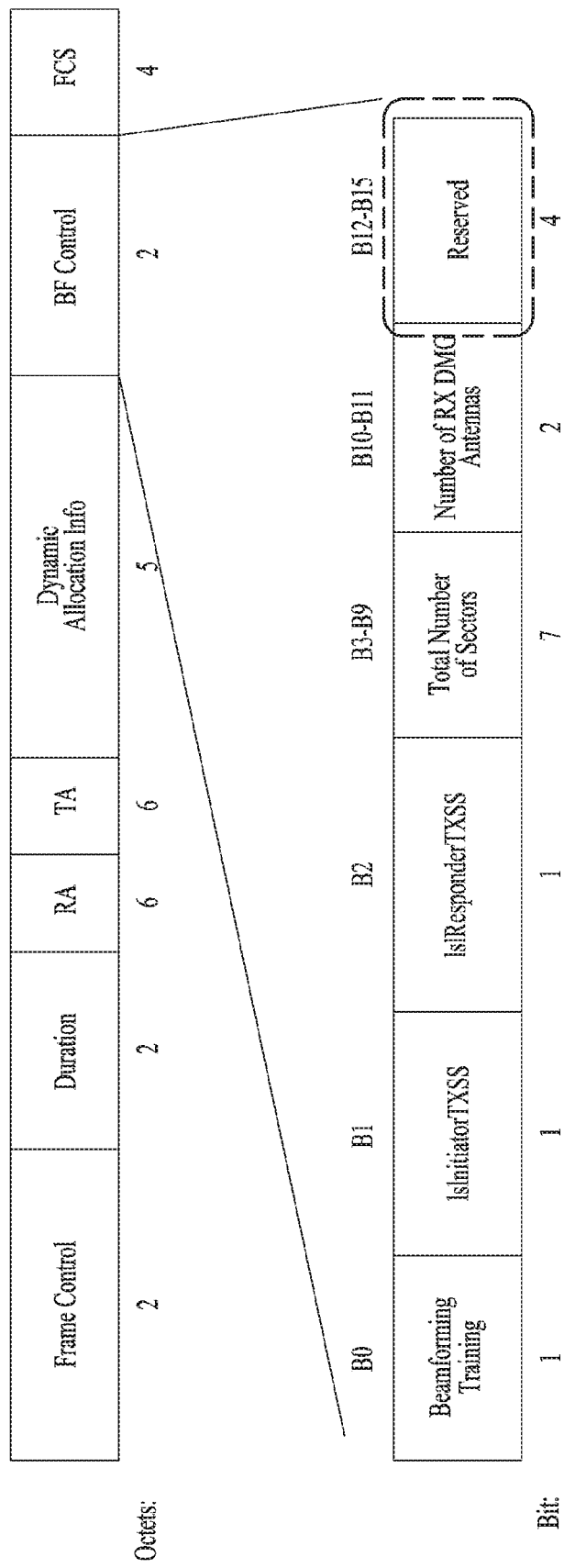
FIG. 22 is a diagram illustrating a format of a grant frame according to an example of the present invention.

FIG. 22 is a diagram illustrating a format of a grant frame according to an example of the present invention.

As shown in FIG. 22, the grant frame according to the present invention has a format similar to the grant frame format of the 11ad system but may include a channel allocation subfield for signaling allocation information according to the present invention.

The channel allocation subfield may be configured with four bits, and a PCP/AP or separate STA may signal information on an alternative primary channel and an allocated bandwidth during a dynamic allocation period through the channel allocation subfield.

For example, as shown in Table 7, the PCP/AP or separate STA that transmits the grant frame may indicate which one of four channels is used as the alternative primary channel during the corresponding dynamic allocation period, using first and second bits among the four bits of the channel allocation subfield. In addition, as shown in Table 8, the PCP/AP or separate STA may indicate the information on the allocated bandwidth using third and fourth bits among the four bits of the channel allocation subfield.

TABLE 7

| First Bit | Second Bit | Description |
|---|---|---|
| 0 | 0 | Channel 1 is alternative primary channel |
| 0 | 1 | Channel 2 is alternative primary channel |
| 1 | 1 | Channel 3 is alternative primary channel |
| 1 | 0 | Channel 4 is alternative primary channel |

TABLE 8

| Third Bit | Fourth Bit | Description |
|---|---|---|
| 0 | 0 | Bandwidth is 2.16 GHz |
| 0 | 1 | Bandwidth is 4.32 GHz |

TABLE 8-continued

| Third Bit | Fourth Bit | Description |
|---|---|---|
| 1 | 1 | Bandwidth is 6.48 GHz |
| 1 | 0 | Bandwidth is 8.64 GHz |

Figure 23:
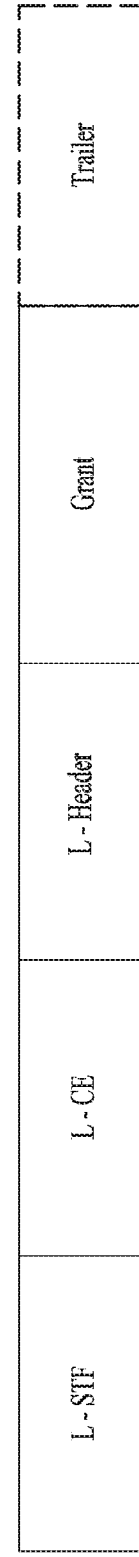
FIG. 23 is a diagram illustrating a configuration for a PCP/AP to transmit a separate control trailer together with a grant frame according to the present invention.

FIG. 23 is a diagram illustrating a configuration for a PCP/AP or separate STA to transmit a separate control trailer together with a grant frame according to the present invention.

As shown in FIG. 23, the PCP/AP or separate STA can transmit the separate control trailer together with the grant frame (e.g., the grant frame supported by the 11ad system). In this case, the control trailer may contain information on the alternative primary channel and allocated bandwidth during the dynamic allocation period as described above.

That is, as described above with reference to FIGS. 22 and 23, the PCP/AP or separate STA may provide the information on the allocated bandwidth and alternative primary channel to a specific STA using the bit information included in the grant frame or the separate control trailer. In this case, the control trailer may have a size of 8 bits, but the present invention is not limited to the size of the control trailer. For example, the control trailer may include a 1-bit indicator for indicating a channel aggregation mode, an 8-bit indicator for indicating the allocated bandwidth, and a 3-bit indicator for indicating the alternative primary channel during the corresponding dynamic allocation period.

Hereinafter, a description will be given of various options for the PCP/AP or separate STA according to the present invention to provide the information on the allocated bandwidth and alternative primary channel to the specific STA. In this case, a signaling method for each option can be configured in consideration of channelization and supportable channel bonding capability. In addition, the respective options can be applied either in an independent manner or in a mutual complementary manner 2-2-2-1. Option 1

Figure 24:
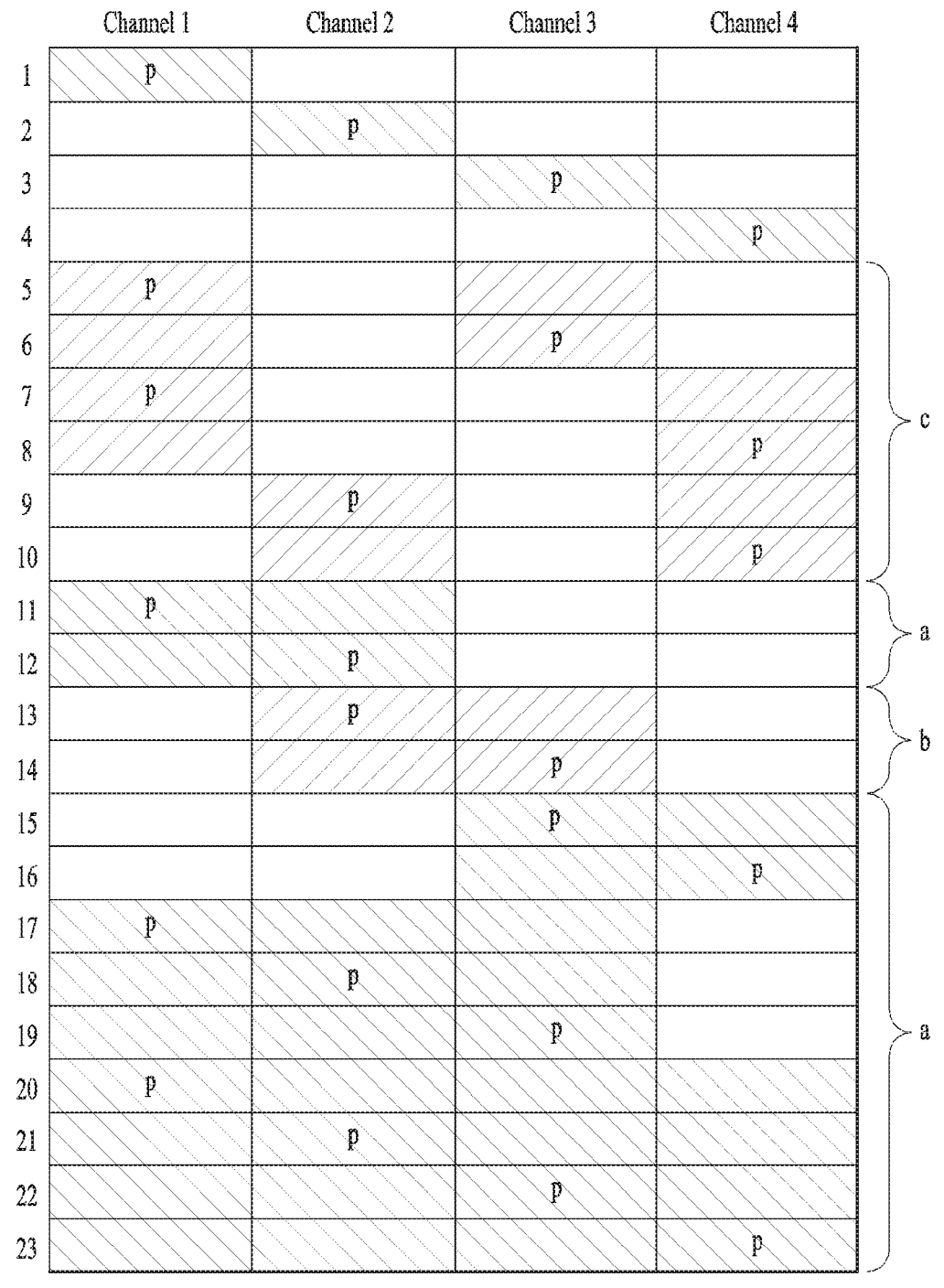

FIG. 24 is a diagram illustrating a method performed by the PCP/AP or separate STA to provide the information on the allocated bandwidth and alternative primary channel to the specific STA according to option 1.

Option 1 corresponds to a method for providing channel allocation information when a total of four channels are supported and non-overlap channelization is applied. Herein, 'p' denotes the primary channel or alternative primary channel, 'a' denotes contiguous channel bonding of up to four channels, 'b' denotes contiguous channel aggregation, and 'c' denotes non-contiguous channel aggregation.

As illustrated in FIG. 24, in the case of option 1 (where the total four channels are supported and the non-overlap channelization is applied), the PCP/AP or separated STA may signal all cases included in option 1 through 5-bit allocation information.

2-2-2-2. Option 2

FIG. 25 is a diagram illustrating a method performed by the PCP/AP or separate STA to provide the information on the allocated bandwidth and alternative primary channel to the specific STA according to option 2.

Option 2 corresponds to a method for providing channel allocation information when a total of six channels are supported and the non-overlap channelization is applied.

As illustrated in FIG. 25, in the case of option 2, the PCP/AP or separated STA may signal all cases included in option 2 through 6-bit allocation information.

2-2-2-3. Option 3

Figure 26:
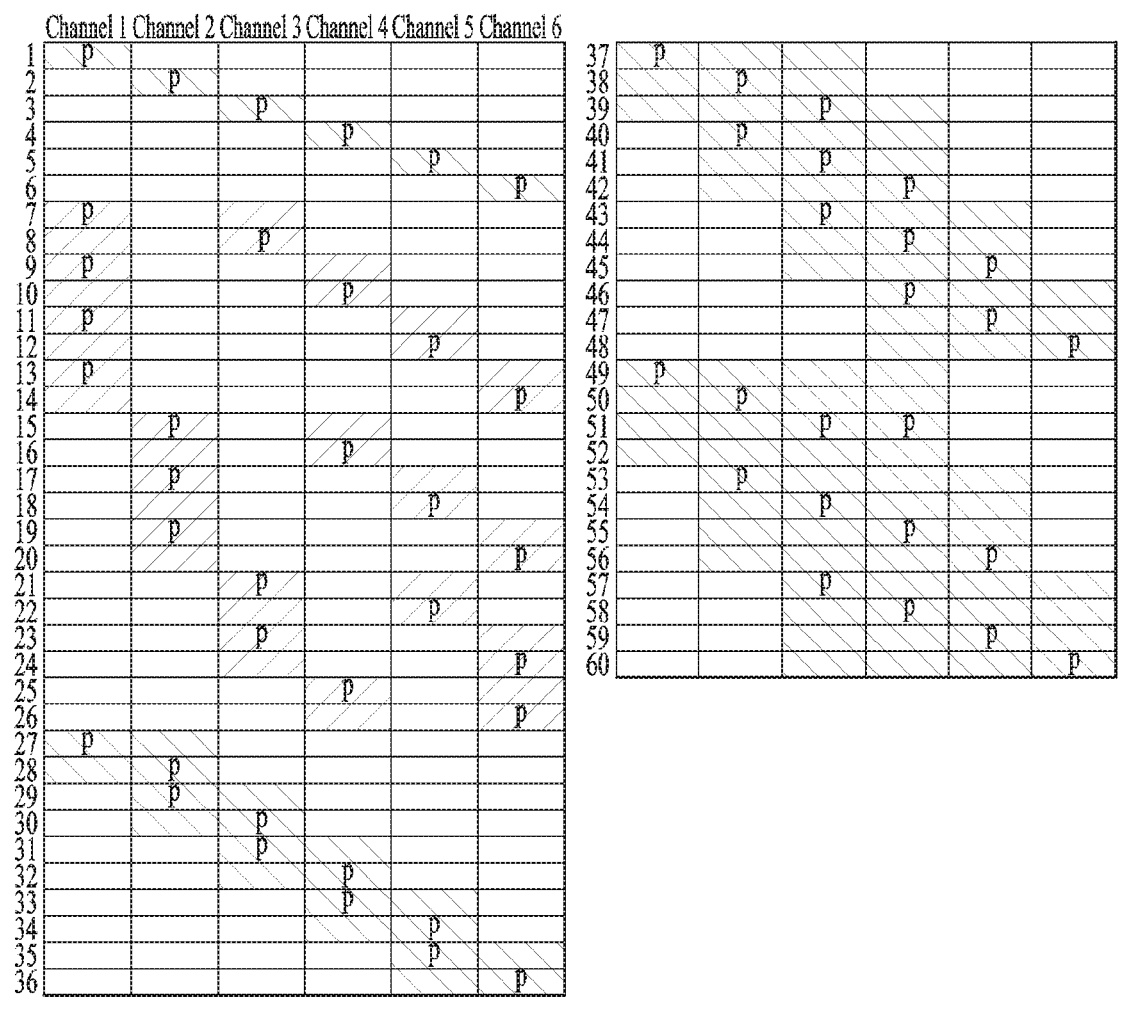

FIG. 26 is a diagram illustrating a method performed by the PCP/AP or separate STA to provide the information on the allocated bandwidth and alternative primary channel to the specific STA according to option 3.

Option 3 corresponds to a method for providing channel allocation information when a total of six channels are supported and overlap channelization is applied.

As illustrated in FIG. 26, in the case of option 3, the PCP/AP or separated STA may signal all cases included in option 3 through 6-bit allocation information.

2-2-2-4. Additional Option

The aforementioned options can be applied to particular methods performed by the PCP/AP and separate STA to transmit the information on the alternative primary channel and allocated bandwidth through the grant frame or the grant frame to which the control trailer is applied. However, the PCP/AP or separate STA may also transmit the information through the beacon frame or announcement (announce) frame.

FIG. 27 is a diagram illustrating an extended schedule element included in a beacon or announcement (announce) frame applicable to the present invention.

As shown in FIG. 27, an allocation control field may occupy three octets or more. In this case, the allocation control field may include a 1-bit channel aggregation mode subfield, an 8-bit bandwidth subfield, and a 3-bit (alternative) primary channel subfield. Alternatively, the PCP/AP or separate STA may signal information on FDMA allocation, SU-MIMO allocation, MU-MIMO allocation, and the like using reserved cases of an allocation type subfield included in the allocation control field together with the above-described information.

As another embodiment, the PCP/AP or separate STA can control beamforming training for FDMA, SU-MIMO, MU-MIMO, channel bonding, channel aggregation, and the like by modifying a beamforming control field or configuring a new EDMG beamforming control field.

As a further embodiment, the PCP/AP or separate STA may set a 'size of a total number of sectors' subfield to be equal to or greater than 7 bits by modifying the beamforming control field or configuring the new EDMG beamforming control field. In addition, the PCP/AP or separate STA may modify a 'number of Rx DMG antennas' subfield as an 'Rx chain ID' field or newly add the 'Rx chain ID' field while maintaining the 'number of Rx DMG antennas' subfield. In addition, by newly defining a subfield for indicating which type of beam forming is performed, the PCP/AP or separate STA may control beamforming training for the SU-MIMO, MU-MIMO, channel bonding, channel aggregation, and the like.

As described above, the PCP/AP or separate STA can provide the above-described information to the specific STA through the beacon or announcement (announce) frame, the grant frame, or the grant frame to which the control trailer is applied.

2-2-3. Channel Allocation Method

As described above, the PCP/AP or separate STA can allocate the dynamic allocation period to at least one STA through the grant frame. In this case, the channel allocation method according to the present invention may be characterized as follows.

(1) The dynamic allocation period allocated by the grant frame cannot overlap with an allocation period preconfigured by the beacon or announcement (announce) frame. However, a case in which the allocation period preconfigured by the beacon or announcement (announce) frame is dropped or terminated due to a request from an STA is exempted.

(2) When dynamic allocation periods are allocated to a plurality of channels, dynamic allocation periods on different channels can overlap with each other in the time domain.

(3) In addition, when dynamic allocation periods are allocated to a plurality of channels, dynamic allocation periods on the same channel can overlap with each other in the time domain.

(4) During the GP, the PCP/AP or separate STA can allocate dynamic allocation periods corresponding to the CBAP and/or SP to a plurality of STAs.

(5) In particular, the PCP/AP or separate STA can individually and dynamically perform channel allocation for each of the plurality of STAs during the GP, and in this case, the CBAP or SP can be applied to the allocated dynamic allocation period.

(6) As described above, the PCP/AP or separate STA can allocate the dynamic allocation period to at least one STA through the grant frame, and to this end, the grant frame may include an AID for the at least one STA. Alternatively, the grant frame may include a group ID in which the at least one STA is included, or a partial AID (PAID) for the at least one STA.

3. Control Frame Structure

A control frame including the aforementioned grant frame, RTS frame, DMG CTS frame as well as a sector level sweep (SLS) frame has a limited structure due to the system characteristics (for example, an EDMG header A field cannot be included like the above-described PPDU). In particular, to support both of the legacy STA and the 11ay STA, the control frame structure shown in FIG. 28 has been considered in the 11ay system.

Figure 28:
FIG. 28 is a diagram illustrating a structure of a control frame according to another embodiment of the present invention.

FIG. 28 is a diagram illustrating a structure of a control frame according to another embodiment of the present invention.

In FIG. 28, L-Part (i.e., L-STF, L-CE, and L-Header) corresponds to the legacy structure. In this case, AGC and TRN fields may be selectively included according to signaling through L-Header.

In the 11ay system, not only information for the legacy STA operating based on the 11ad system but also additional information for the 11ay STA should be signaled.

To this end, the present invention proposes a method for signaling an 11ay STA to recognize (or decode) AGC and TRN fields as a data part through Packet Type, which indicates a type of the TRN field, Training Length, and reserved bits included in an L-Header field.

That is, when the AGC and TRN fields are transmitted as the data part, the AGC and TRN fields can include the following information.

(1) Bandwidth

A PCP/AP or STA can inform the number of channels or frequency bandwidths used in channel bonding by transmitting a control frame. Thus, after receiving the control frame (e.g., RTS/DMG CTS frame, grant frame, SRP frame, etc.), an STA can obtain information on available channels or frequency bandwidths.

(2) Alternative Primary Channel

A PCP/AP or STA can indicate a channel that can be used as a primary channel (or operating channel) by an STA allocated a predetermined length of allocation period, by transmitting a control frame. Thus, after receiving the control frame (e.g., RTS/DMG CTS frame, grant frame, SRP frame, etc.), an STA can recognize the channel indicated through the control frame as the primary channel during the allocation period and then use the channel as the operating channel.

(3) Antenna ID

A PCP/AP or STA can provide information on an antenna ID(s) currently used by at least one STA by transmitting a control frame. For example, when the total number of antennas supported by the 11ay system is X, the PCP/AP or STA may signal whether each antenna is used, using an ON/OFF scheme through bit information with a size of X.

(4) Channel Number

A PCP/AP or STA can provide information on indices or order of channels currently used by at least one STA by transmitting a control frame. For example, when the total number of channels supported by the flay system is Y, the PCP/AP or STA may signal whether each of the channels is used, using an ON/OFF scheme through bit information with a size of Y.

(5) Multi-Channel CCA

A PCP/AP or STA can instruct at least one STA to independently perform CCA per channel by transmitting a control frame.

Alternatively, the PCP/AP or STA can independently designate or configure a CCA parameter for each channel by transmitting the control frame.

Alternatively, the PCP/AP or STA can indicate that a preconfigured CCA value may vary in each channel by transmitting the control frame.

Alternatively, the PCP/AP or STA can divide a predetermined CCA threshold value into several levels and then indicate which level a CCA value measured in each channel matches, by transmitting the control frame.

(6) MU

In the case of MU transmission, a PCP/AP or STA can transmit control information to a plurality of STAs by transmitting a control frame.

In general, since a Payload field contains information for one specific UE, information for other STAs except the one specific UE may be included in the AGC and/or TRN fields.

In this case, information indicating that the control frame is for a total of Z STAs may be included in the L-Header or Payload field. In addition, the L-Header or Payload field may further include information indicating which STA the data included in the AGC and/or TRN field corresponds to.

Alternatively, the AGC and/or TRN field may include information for other STAs in predetermined order.

The newly proposed control frame structure can be applied to not only the grant frame according to the present invention as described above but also various control frames extensively.

4. Device Configuration

Figure 29:
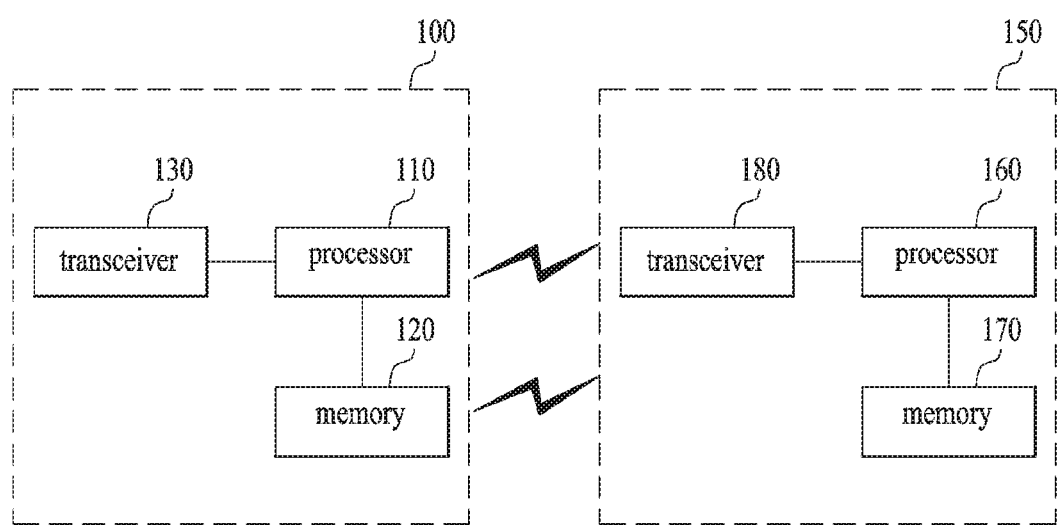
FIG. 29 is a diagram for explaining devices for implementing the above-described methods.

FIG. 29 is a diagram illustrating devices for implementing the above-described method.

The wireless device 100 of FIG. 29 may correspond to a specific STA of the above description, and the wireless device 150 may correspond to the PCP/AP of the above description.

The STA 100 may include a processor 110, a memory 120 and a transceiver 130. The PCP/AP 150 may include a processor 160, a memory 170, and a transceiver 180. The transceivers 130 and 180 may transmit/receive wireless signals and may be implemented in a physical layer such as IEEE 802.11/3GPP. The processors 110 and 160 are implemented in the physical layer and/or MAC layer and are connected to the transceivers 130 and 180. The processors 110 and 160 may perform the UL MU scheduling procedure described above.

The processors 110 and 160 and/or the transceivers 130 and 180 may include application specific integrated circuits (ASICs), other chipsets, logic circuits, and/or data processors. The memories 120 and 170 may include a read-only memory (ROM), a random access memory (RAM), a flash memory, a memory card, a storage medium and/or other storage units. When an embodiment is executed by software, the method described above may be executed as a module (e.g., a process, a function) that performs the functions described above. The module may be stored in the memory 120,170 and executed by the processor 110,160. The memory 120, 170 may be located inside or outside the processor 110, 160 and may be connected to the processor 110, 160 by a well-known means.

The detailed description of preferred embodiments of the invention set forth above is provided to enable those skilled in the art to implement and practice the invention. Although the present invention has been fully described by way of example with reference to the accompanying drawings, it is to be understood that various modifications and changes may be made in the invention without departing from the scope and spirit of the invention. Accordingly, the present invention is not intended to be limited to the embodiments disclosed herein but is to be accorded the widest scope consistent with the principles and novel features disclosed herein.

INDUSTRIAL APPLICABILITY

Although the present invention is described on the assumption that the invention is applied to the WLAN system based on IEEE 802.11, it is not limited thereto. The present invention can be applied to various wireless systems capable of data transmission based on channel bonding in the same manner.

What is claimed is:

1. A method for transmitting data by a station (STA) in a wireless local area network (WLAN) system, the method comprising:
   receiving a poll frame from an access point (AP);
   in response to the poll frame, transmitting a service period request (SPR) frame including either (i) a first configuration related to a specific channel or (ii) a second configuration related to a channel bandwidth;
   after transmitting the SPR frame, receiving a grant frame for dynamically allocating an allocation period within a data transmission interval (DTI) from the AP, during the DTI,
   wherein the grant frame comprises dynamic allocation information for, during the allocation period, allocating either a plurality of channels including a primary channel of the WLAN system or at least one secondary channel except the primary channel; and
   transmitting data in the allocation period through either the plurality of channels including the primary channel or the at least one secondary channel except the primary channel allocated by the dynamic allocation information.

2. The method of claim 1, wherein, based on the at least one secondary channel except the primary channel being allocated in the allocation period, the dynamic allocation information further comprises information indicating an alternative primary channel that operates as the primary channel during the allocation period.

3. The method of claim 2, wherein, based on the at least one secondary channel except the primary channel being allocated in the allocation period, the STA performs a backoff procedure through the alternative primary channel during the allocation period or performs at least one network allocation vector (NAV) configuration.

4. The method of claim 1, wherein the grant frame is received during a grant period (GP).

5. The method of claim 1, wherein the grant frame further comprises information on a channel bandwidth allocated to the STA.

6. The method of claim 1, wherein the allocation period is a contention-based access period (CBAP) or a service period (SP).

7. The method of claim 1, wherein, based on the plurality of channels including the primary channel being allocated during the allocation period, the STA transmits the data by bonding or aggregating the plurality of channels.

8. The method of claim 1, wherein the first configuration or the second configuration is received via a trailer included in the SPR frame.

9. A method for receiving data by a station (STA) in a wireless local area network (WLAN) system, the method comprising:
  receiving a poll frame from an access point (AP);
  in response to the poll frame, transmitting a service period request (SPR) frame including either (i) a first configuration related to a specific channel or (ii) a second configuration related to a channel bandwidth;
  after transmitting the SPR frame, receiving a grant frame for dynamically allocating an allocation period within a data transmission interval (DTI) from the AP, during the DTI,
  wherein the grant frame comprises dynamic allocation information for, during the allocation period, allocating either a plurality of channels including a primary channel of the WLAN system or at least one secondary channel except the primary channel; and
  receiving data in the allocation period through either the plurality of channels including the primary channel or the at least one secondary channel except the primary channel allocated by the dynamic allocation information.

10. The method of claim 9, wherein, based on the at least one channel except the primary channel being allocated in the allocation period, the dynamic allocation information further comprises information indicating an alternative primary channel that operates as the primary channel during the allocation period.

11. The method of claim 10, wherein, based on the at least one secondary channel except the first primary channel being allocated in the allocation period, the STA performs a backoff procedure through the alternative primary channel during the allocation period or performs at least one network allocation vector (NAV) configuration.

12. The method of claim 9, wherein the grant frame is received during a grant period (GP).

13. The method of claim 9, wherein the grant frame further comprises information on a channel bandwidth allocated to the STA.

14. The method of claim 9, wherein the allocation period is a contention-based access period (CBAP) or a service period (SP).

15. The method of claim 9, wherein, based on the plurality of channels including the primary channel being allocated during the allocation period, the STA receives the data by bonding or aggregating the plurality of channels.

16. A station (STA) for transmitting data in a wireless local area network (WLAN) system, the STA comprising:
  a transceiver with at least one radio frequency (RF) chain, wherein the transceiver transmits and receives frame signals to and from another STA, or an access point (AP); and
  a processor connected to the transceiver, wherein the processor is configured to process the frame signal received by the transceiver,
  wherein the processor controls the transceiver to:
  receive a poll frame from the AP;
  in response to the poll frame, transmit a service period request (SPR) frame including either (i) a first configuration related to a specific channel or (ii) a second configuration related to a channel bandwidth;
  after transmitting the SPR frame, receive a grant frame for dynamically allocating an allocation period within a data transmission interval (DTI) from the AP during the DTI,
  wherein the grant frame comprises dynamic allocation information for, during the allocation period, allocating either a plurality of channels including a primary channel of the WLAN system or at least one secondary channel except the primary channel, and
  transceiver to transmit data in the allocation period through either the plurality of channels including the primary channel or the at least one secondary channel except the primary channel allocated by the dynamic allocation information.

17. A station (STA) for receiving data in a wireless local area network (WLAN) system, the STA comprising:
  a transceiver with at least one radio frequency (RF) chain, wherein the transceiver transmits and receives frame signals to and from another STA, or an access point (AP); and
  a processor connected to the transceiver, wherein the processor is configured to process the frame signal received by the transceiver,
  wherein the processor controls the transceiver to:
  receive a poll frame from the AP;
  in response to the poll frame, transmit a service period request (SPR) frame including either (i) a first configuration related to a specific channel or (ii) a second configuration related to a channel bandwidth;
  after transmitting the SPR frame, receive a grant frame for dynamically allocating an allocation period within a data transmission interval, DTI, from the AP during the DTI,
  wherein the grant frame comprises dynamic allocation information for, during the allocation period, allocating either a plurality of channels including a primary channel of the WLAN system or at least one secondary channel except the primary channel, and
  receive data in the allocation period through either the plurality of channels including the primary channel or the at least one secondary channel except the primary channel allocated by the dynamic allocation information.

* * * * *